(12) United States Patent
Chang

(10) Patent No.: US 9,069,159 B2
(45) Date of Patent: Jun. 30, 2015

(54) ZOOM LENS

(71) Applicants: Sintai Optical (Shenzhen) Co., Ltd., Shenzhen, Guandong Province (CN); Asia Optical International Ltd., Tortola (GB)

(72) Inventor: Yu-Min Chang, Taichung (TW)

(73) Assignees: SINTAI OPTICAL (SHENZHEN) CO., LTD., Shenzhen, Guandong Province (CN); ASIA OPTICAL INTERNATIONAL LTD., Tortola (VG)

(*) Notice: Subject to any disclaimer, the term of this patent is extended or adjusted under 35 U.S.C. 154(b) by 0 days.

(21) Appl. No.: 14/178,398

(22) Filed: Feb. 12, 2014

(65) Prior Publication Data
US 2014/0285902 A1 Sep. 25, 2014

(30) Foreign Application Priority Data

Mar. 19, 2013 (TW) .............................. 102109601 A

(51) Int. Cl.
- *G02B 15/177* (2006.01)
- *G02B 13/00* (2006.01)
- *G02B 15/20* (2006.01)

(52) U.S. Cl.
CPC .............. *G02B 15/177* (2013.01); *G02B 15/20* (2013.01); *G02B 13/009* (2013.01)

(58) Field of Classification Search
CPC ..... G02B 15/177; G02B 15/20; G02B 13/009
See application file for complete search history.

(56) References Cited

U.S. PATENT DOCUMENTS

| | | | |
|---|---|---|---|
| 7,206,138 B2 * | 4/2007 | Katakura et al. | 359/689 |
| 7,405,886 B2 * | 7/2008 | Chang | 359/689 |
| 8,094,382 B2 * | 1/2012 | Agatsuma | 359/689 |
| 8,699,147 B2 * | 4/2014 | Ori | 359/689 |

* cited by examiner

*Primary Examiner* — David N Spector
(74) *Attorney, Agent, or Firm* — McClure, Qualey & Rodack, LLP

(57) ABSTRACT

A zoom lens includes a first lens group, a second lens group and a third lens group, all of which are arranged in sequence from an object side to an image side along an optical axis. The first lens group is with negative refractive power and includes a first lens, a second lens and a third lens, wherein the first lens is with negative refractive power, the second lens is with positive refractive power and the third lens is with negative refractive power. The second lens group is with positive refractive power. The third lens group is with positive refractive power. The third lens satisfies $|R_{31}/R_{32}| \leq 0.39$, wherein $R_{31}$ is a radius of curvature of an object side surface of the third lens and $R_{32}$ is a radius of curvature of an image side surface of the third lens.

22 Claims, 25 Drawing Sheets

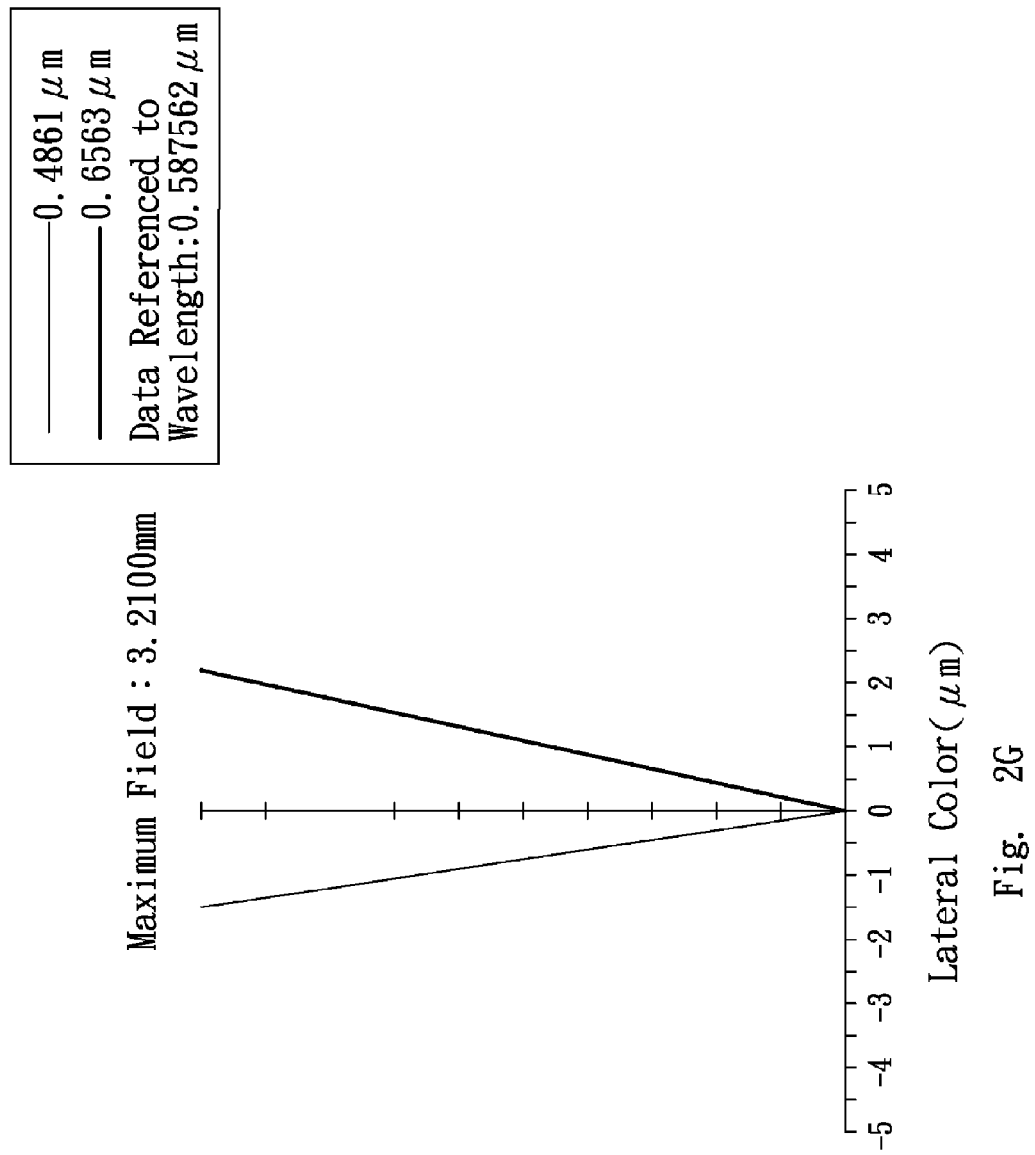

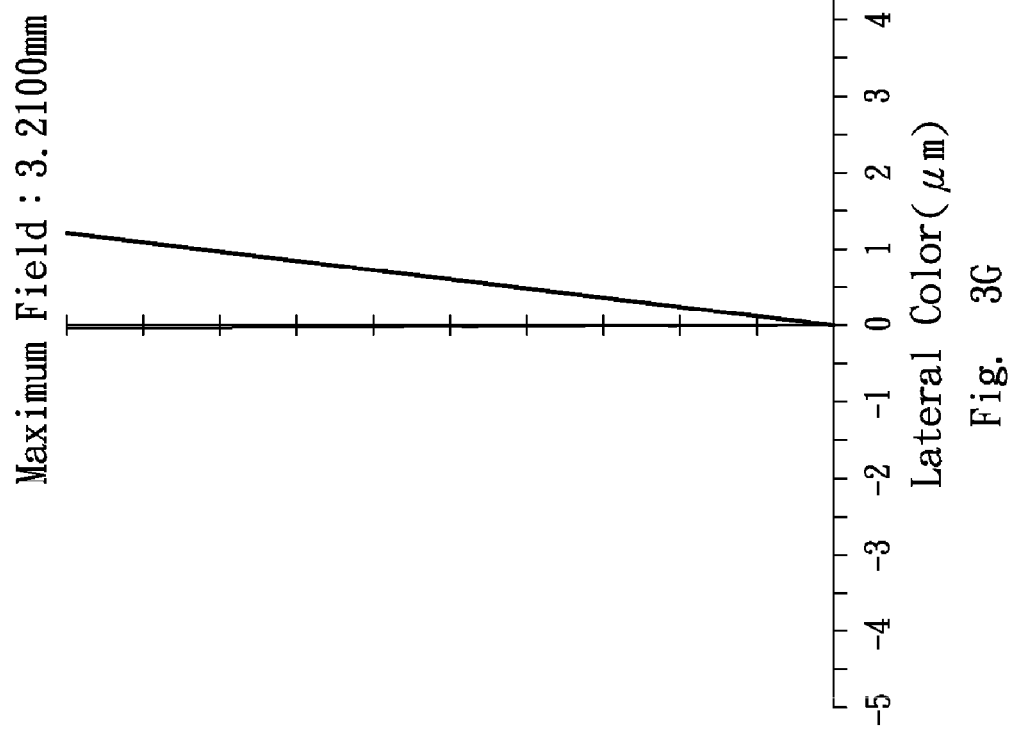

ZOOM LENS

BACKGROUND OF THE INVENTION

1. Field of the Invention

The invention relates to a lens, and more particularly to a zoom lens.

2. Description of the Related Art

A consumer digital still camera is almost equipped with a zoom lens. Currently, a zoom lens with 3-5 times zoom ratio is a very mature product. The trends of consumer electronics have been gradually toward miniaturization. In order to achieve the purpose of miniaturization for consumer digital still camera, the zoom lens that is used for consumer digital still camera also requires miniaturization. However, it is not easy to achieve that a zoom lens is miniaturized and still has a good optical performance.

BRIEF SUMMARY OF THE INVENTION

The invention provides a zoom lens to solve the above problems. The zoom lens has characteristic of a miniaturization and still has a good optical performance.

The zoom lens in accordance with an exemplary embodiment of the invention includes a first lens group, a second lens group and a third lens group, all of which are arranged in sequence from an object side to an image side along an optical axis. The first lens group is with negative refractive power and includes a first lens, a second lens and a third lens, all of which are arranged in sequence from the object side to the image side along the optical axis, wherein the first lens is with negative refractive power, the second lens is with positive refractive power and the third lens is with negative refractive power. The second lens group is with positive refractive power. The third lens group is with positive refractive power. The third lens satisfies the condition: $|R_{31}/R_{32}| \leq 0.39$, wherein $R_{31}$ is a radius of curvature of an object side surface of the third lens and $R_{32}$ is a radius of curvature of an image side surface of the third lens.

In another exemplary embodiment, the second lens group moves toward the object side, an interval between the first lens group and the second lens group decreases as the first lens group moves toward the image side and then moves toward the object side and the third lens group moves when the zoom lens zooms from wide-angle end to telephoto end.

In yet another exemplary embodiment, the first lens group, the second lens group, the third lens group and the fourth lens satisfy: $0.30 \leq (f_{G1} \times f_{G2})/(f_3 \times f_4) \leq 0.75$ wherein $f_{G1}$ is an effective focal length of the first lens group, $f_{G2}$ is an effective focal length of the second lens group, $f_3$ is an effective focal length of the third lens and $f_4$ is an effective focal length of the fourth lens.

In another exemplary embodiment, the first lens group and the second lens group satisfy: $1.24 \leq |f_{G1}/f_{G2}| \leq 1.27$ wherein $f_{G1}$ is an effective focal length of the first lens group and $f_{G2}$ is an effective focal length of the second lens group.

In yet another exemplary embodiment, the zoom lens satisfies: $1.66 \leq (f_w \times L_T)/(f_T \times Y) \leq 3.08$ wherein $f_w$ is an effective focal length of the zoom lens at wide-angle end, $f_T$ is an effective focal length of the zoom lens at telephoto end, Y is a largest image height at image plane and $L_T$ is a lens length of the zoom lens at telephoto end.

In another exemplary embodiment, the first lens is a convex-concave lens and includes a convex surface facing the object side, the second lens is a biconvex lens and the third lens is a concave-convex lens and includes a concave surface facing the object side.

In yet another exemplary embodiment, the third lens includes two surfaces, at least one of which is an aspheric surface or both of which are aspheric surfaces.

In another exemplary embodiment, the first lens includes two surfaces, at least one of which is an aspheric surface or both of which are aspheric surfaces.

In yet another exemplary embodiment, the second lens group includes a fourth lens, a fifth lens and a sixth lens, all of which are arranged in sequence from the object side to the image side along the optical axis.

In another exemplary embodiment, the fourth lens is with positive refractive power, the fifth lens is with positive refractive power and the sixth lens is with negative refractive power.

In yet another exemplary embodiment, the fourth lens is a biconvex lens and the fifth lens is a biconvex lens.

In another exemplary embodiment, the sixth lens includes two surfaces, at least one of which is an aspheric surface or both of which are aspheric surfaces.

In yet another exemplary embodiment, at least a surface of the first lens group is an aspheric surface and at least two surfaces of the second lens group are aspheric surfaces.

In another exemplary embodiment, the third lens group includes a seventh lens, the seventh lens is a biconvex lens and includes two surfaces, at least one of which is an aspheric surface or both of which are aspheric surfaces.

In yet another exemplary embodiment, the seventh lens moves toward the object side when the zoom lens focuses in short distance photography.

In another exemplary embodiment, the zoom lens further includes a stop disposed between the first lens group and the second lens group, wherein an interval between the stop and the second lens group is stationary.

The zoom lens in accordance with an exemplary embodiment of the invention includes a first lens group, a second lens group and a third lens group, all of which are arranged in sequence from an object side to an image side along an optical axis. The first lens group is with negative refractive power and includes a first lens, a second lens and a third lens, all of which are arranged in sequence from the object side to the image side along the optical axis, wherein the first lens is with negative refractive power, the second lens is with positive refractive power and the third lens is with negative refractive power. The second lens group is with positive refractive power and includes a fourth lens, a fifth lens and a sixth lens, all of which are arranged in sequence from the object side to the image side along the optical axis. The third lens group is with positive refractive power.

In another exemplary embodiment, the third lens satisfies the following condition: $|R_{31}/R_{32}| \leq 0.39$, wherein $R_{31}$ is a radius of curvature of an object side surface of the third lens and $R_{32}$ is a radius of curvature of an image side surface of the third lens.

In yet another exemplary embodiment, the fourth lens is with positive refractive power and the fifth lens is with positive refractive power.

In another exemplary embodiment, the fourth lens is a biconvex lens and the fifth lens is a biconvex lens.

In yet another exemplary embodiment, the fourth lens and the fifth lens are separated by an air gap.

In another exemplary embodiment, the zoom lens satisfies: $1.66 \leq (f_w \times L_T)/(f_T \times Y) \leq 3.08$ wherein $f_w$ is an effective focal length of the zoom lens at wide-angle end, $f_T$ is an effective focal length of the zoom lens at telephoto end, Y is a largest image height at image plane and $L_T$ is a lens length of the zoom lens at telephoto end.

In yet another exemplary embodiment, the first lens group and the second lens group satisfy: $1.24 \leq |f_{G1}/f_{G2}| \leq 1.27$ wherein $f_{G1}$ is an effective focal length of the first lens group and $f_{G2}$ is an effective focal length of the second lens group.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 2G is a lateral color diagram of a zoom lens at wide-angle end in accordance with a first embodiment of the invention;

FIG. 3G is a lateral color diagram of a zoom lens at medium end in accordance with a first embodiment of the invention;

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
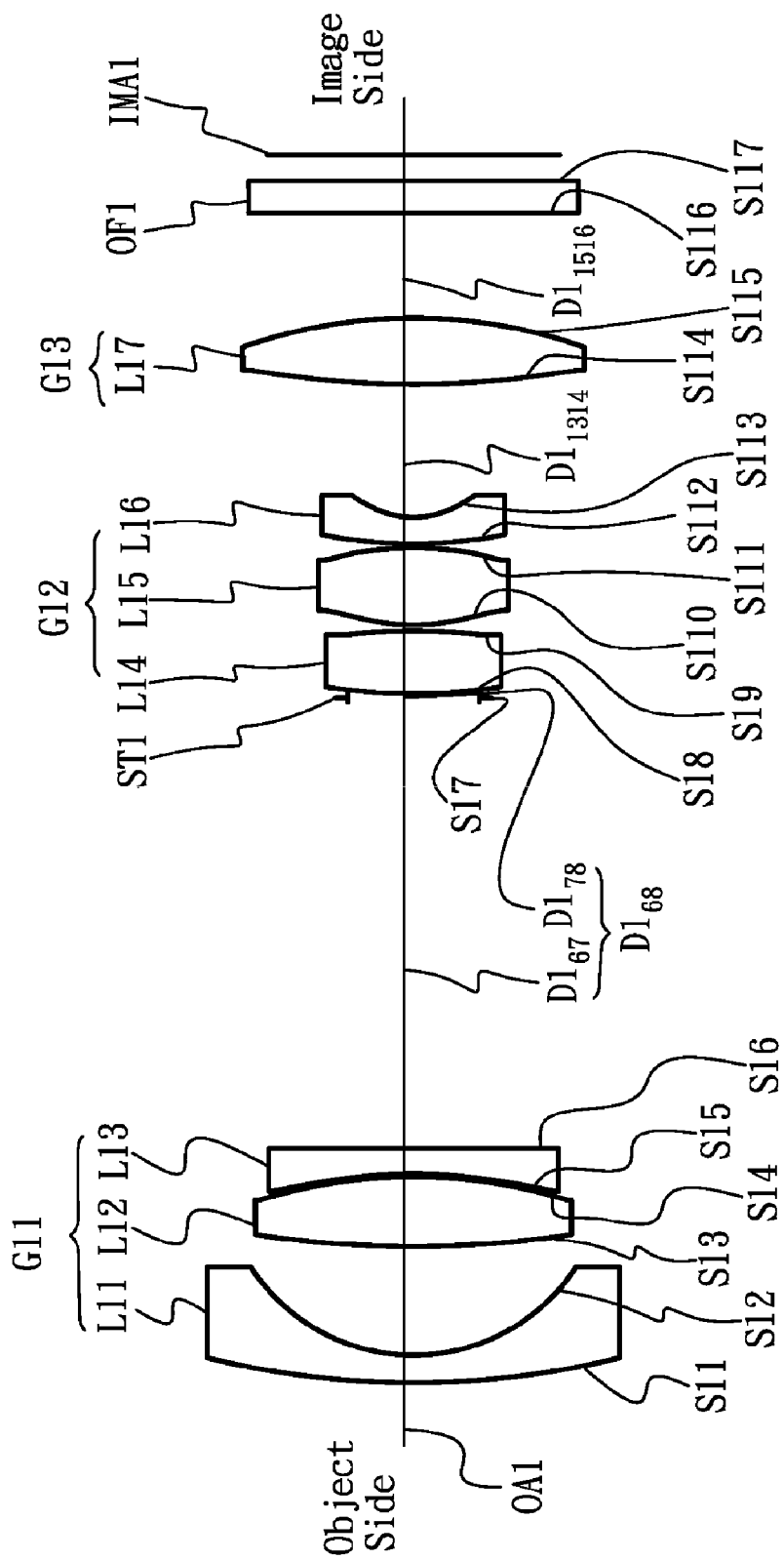
FIG. 1 is a lens layout diagram of a zoom lens at wide-angle end in accordance with a first embodiment of the invention.

Referring to FIG. 1, FIG. 1 is a lens layout diagram of a zoom lens at wide-angle end in accordance with a first embodiment of the invention. The zoom lens 1 includes a first lens group G11, a stop ST1, a second lens group G12, a third lens group G13 and an optical filter OF1, all of which are arranged in sequence from an object side to an image side along an optical axis OA1. The first, second and third lens groups G11, G12 and G13 are moved when the zoom lens 1 zooms from a wide-angle end to a telephoto end. Specifically, the second lens group G12 is moved toward the object side, the first lens group G11 is moved toward the image side and then toward the object side so that an interval $D1_{68}$ between the first lens group G11 and the second lens group G12 decreases, and the third lens group G13 is moved so that an interval $D1_{1314}$ between the second lens group G12 and the third lens group G13 varies. Therefore, an effective focal length of the zoom lens 1 is adjustable by means of changing the intervals $D1_{68}$, $D1_{1314}$ of the lens groups when the zoom lens 1 is in use.

In the present embodiment, the first lens group G11 is with negative refractive power, the second lens group G12 is with positive refractive power and the third lens group G13 is with positive refractive power.

The first lens group G11 includes a first lens L11, a second lens L12 and a third lens L13, all of which are arranged in sequence from the object side to the image side along the optical axis OA1. The first lens L11 is a convex-concave lens and with negative refractive power. The object side surface S11 of the first lens L11 is a convex surface. The second lens L12 is a biconvex lens and with positive refractive power. The third lens L13 is a concave-convex lens and with negative refractive power. The object side surface S15 of the third lens L13 is a concave surface and the concave surface is an aspheric surface.

The second lens group G12 includes a fourth lens L14, a fifth lens L15 and a sixth lens L16, all of which are arranged in sequence from the object side to the image side along the optical axis OA1. The fourth lens L14 is a biconvex lens and with positive refractive power. The fifth lens L15 is a biconvex lens and with positive refractive power. The object side surface S110 and the image side surface S111 of the fifth lens L15 are aspheric surfaces. The fourth lens L14 and the fifth lens L15 are separated by an air gap. The sixth lens L16 is a convex-concave lens and with negative refractive power. The image side surface S113 of the sixth lens L16 is a concave surface and the concave surface is an aspheric surface.

The third lens group G13 includes a seventh lens L17. The seventh lens L17 is a biconvex lens and with positive refractive power. The object side surface S114 of the seventh lens L17 is an aspheric surface. The seventh lens L17 is moved toward the object side when the zoom lens 1 focuses in short distance photography.

An interval $D1_{78}$ between the stop ST1 and the second lens group G12 is stationary. The optical filter OF1 is a glass plate and includes an object side surface S116 and an image side surface S117. Both of the object side surface S116 and the image side surface S117 are plane surfaces.

In order to maintain good optical performance of the zoom lens 1 in accordance with the present embodiment, the zoom lens 1 must satisfies the following four conditions:

$$|R1_{31}/R1_{32}| \leq 0.39 \quad (1)$$

$$0.30 \leq (f1_{G1} \times f1_{G2})/(f1_3 \times f1_4) \leq 0.75 \quad (2)$$

$$1.24 \leq |f1_{G1}/f1_{G2}| \leq 1.27 \quad (3)$$

$$1.66 \leq (f1_w \times L1_T)/(f1_T \times Y1) \leq 3.08 \quad (4)$$

wherein $R1_{31}$ is the radius of curvature of the object side surface S15 of the third lens L13, $R1_{32}$ is the radius of curvature of the image side surface S16 of the third lens L13, $f1_{G1}$ is the effective focal length of the first lens group G11, $f1_{G2}$ is the effective focal length of the second lens group G12, $f1_3$ is the effective focal length of the third lens L13, $f1_4$ is the effective focal length of the fourth lens L14, $f1_w$ is the effective focal length of the zoom lens 1 at wide-angle end, $f1_T$ is the effective focal length of the zoom lens 1 at telephoto end, Y1 is the largest image height at image plane IMA1 and $L1_T$ is the lens length of the zoom lens 1 at telephoto end.

Due to the above design of the lenses and stop ST1, the zoom lens 1 is miniaturized and provided with a good optical performance.

In order to achieve the above purpose and effectively enhance the optical performance, the zoom lens 1 at the wide-angle end, medium end (not shown) and telephoto end (not shown) of the present embodiment of the invention is provided with the optical specifications shown in Table 1, which include the effective focal length, radius of curvature of each lens surface, thickness between adjacent surface, refractive index of each lens and Abbe number of each lens. Table 1 shows that the effective focal length of the zoom lens 1 at the wide-angle end is equal to 4.01 mm, the effective focal length of the zoom lens 1 at the medium end is equal to 8.42 mm, the effective focal length of the zoom lens 1 at the telephoto end is equal to 11.37 mm, and the zoom ratio of the zoom lens 1 is about 2.84.

TABLE 1

| W (Wide-angle End) | Effective Focal Length = 4.01 mm |
| M (Medium End) | Effective Focal Length = 8.42 mm |
| T (Telephoto End) | Effective Focal Length = 11.37 mm |

| Surface Number | Radius of Curvature (mm) | Thickness (mm) | Nd | Vd | Remark |
|---|---|---|---|---|---|
| S11 | 19.8632 | 0.620 | 1.78 | 50.0 | The First Lens Group G11 The First Lens L11 |
| S12 | 4.430569 | 2.470 | | | |
| S13 | 24.69321 | 1.570 | 1.59 | 31.0 | The First Lens Group G11 The Second Lens L12 |
| S14 | −12.0325 | 0.080 | | | |
| S15 | −10.297 | 0.620 | 1.53 | 56.0 | The First Lens Group G11 The Third Lens L13 |
| S16 | −100 | 10.1610 (W) 2.8531 (M) 1.1200 (T) | | | Interval $D1_{67}$ |
| S17 | ∞ | 0.100 | | | Stop ST1 |
| S18 | 13.055 | 1.420 | 1.70 | 54.6 | The Second Lens Group G12 The Fourth Lens L14 |
| S19 | −13.055 | 0.140 | | | |
| S110 | 4.593 | 1.740 | 1.53 | 56.0 | The Second Lens Group G12 The Fifth Lens L15 |
| S111 | −8.327 | 0.100 | | | |
| S112 | 10.768 | 0.600 | 1.62 | 26.0 | The Second Lens Group G12 The Sixth Lens L16 |
| S113 | 2.011 | 3.0145 (W) 8.3476 (M) 11.6013 (T) | | | Interval $D1_{1314}$ |
| S114 | 20.342 | 1.500 | 1.53 | 56.0 | The Third Lens Group G13 The seventh Lens L17 |
| S115 | −11.84 | 2.3879 (W) 1.8130 (M) 1.4464 (T) | | | Interval $D1_{1516}$ |
| S116 | ∞ | 0.720 | 1.51633 | 64.142 | Optical Filter OF1 |
| S117 | ∞ | 0.590 | | | |

The aspheric surface sag z of each lens in table 1 can be calculated by the following formula:

$$z = ch^2/\{1+[1-(k+1)c^2h^2]^{1/2}\}+Ah^4+Bh^6+Ch^8+Dh^{10}+Eh^{12}+Fh^{14}+Gh^{16}$$

where c is curvature, h is the vertical distance from the lens surface to the optical axis, k is conic constant and A, B, C, D, E, F and G are aspheric coefficients.

In the present embodiment, the conic constant k and the aspheric coefficients A, B, C, D, E, F, G of each surface are shown in Table 2.

TABLE 2

| Surface Number | S15 | S110 | S111 | S113 | S114 |
|---|---|---|---|---|---|
| K | 0.000000E+00 | 0.000000E+00 | 0.000000E+00 | 0.000000E+00 | 0.000000E+00 |
| A | 1.368141E−03 | −5.847036E−03 | 2.740016E−03 | −1.682452E−02 | −4.769844E−04 |
| B | −2.233186E−04 | −3.657729E−04 | −5.237702E−03 | 5.044890E−03 | 1.654535E−04 |
| C | 5.067012E−05 | −2.285653E−04 | 2.609306E−03 | −5.592873E−03 | −3.081101E−05 |
| D | −5.361661E−06 | 8.349327E−05 | −7.413890E−04 | 2.212361E−03 | 2.586328E−06 |
| E | 2.472892E−07 | −1.192736E−05 | 8.732554E−05 | −4.419412E−04 | −7.990939E−08 |
| F | 1.600896E−10 | 0.000000E+00 | 0.000000E+00 | 0.000000E+00 | 0.000000E+00 |
| G | −2.379423E−10 | 0.000000E+00 | 0.000000E+00 | 0.000000E+00 | 0.000000E+00 |

For the zoom lens 1 of the present embodiment, the radius of curvature $R1_{31}$ of the object side surface S15 of the third lens L13 is equal to −10.297 mm, the radius of curvature $R1_{32}$ of the image side surface S16 of the third lens L13 is equal to −100 mm, the effective focal length $f1_{G1}$ of the first lens group G11 is equal to −10.068 mm, the effective focal length $f1_{G2}$ of the second lens group G12 is equal to 8.0106 mm, the effective focal length $f1_3$ of the third lens L13 is equal to −21.508 mm, the effective focal length $f1_4$ of the fourth lens L14 is equal to 9.539 mm, the effective focal length $f1_w$ of the zoom lens 1 at wide-angle end is equal to 4.014 mm, the effective focal length $f1_T$ of the zoom lens 1 at telephoto end is equal to 11.370 mm, the largest image height Y1 at image plane IMA1 is equal to 3.21 mm, and the lens length $L1_T$ of the zoom lens 1 at telephoto end is equal to 26.438 mm. According to the above data, the following values can be obtained:

$$|R1_{31}/R1_{32}|=0.103,$$

$$(f1_{G1} \times f1_{G2})/(f1_3 \times f1_4)=0.393,$$

$$|f1_{G1}/f1_{G2}|=1.257,$$

$$(f1_w \times L1_T)/(f1_T \times Y1)=2.908,$$

which respectively satisfy the above conditions (1)-(4).

Figure 2A:
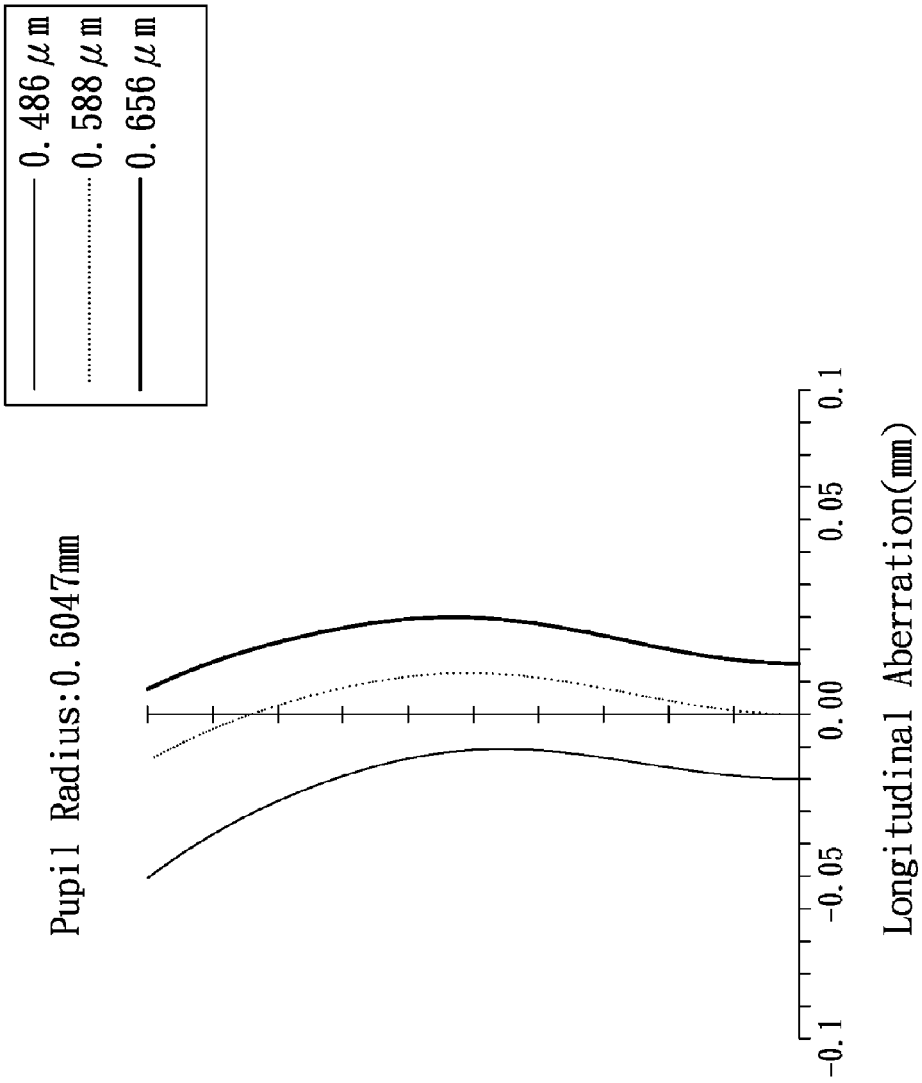
FIG. 2A is a longitudinal aberration diagram of a zoom lens at wide-angle end in accordance with a first embodiment of the invention.
Figure 2B:
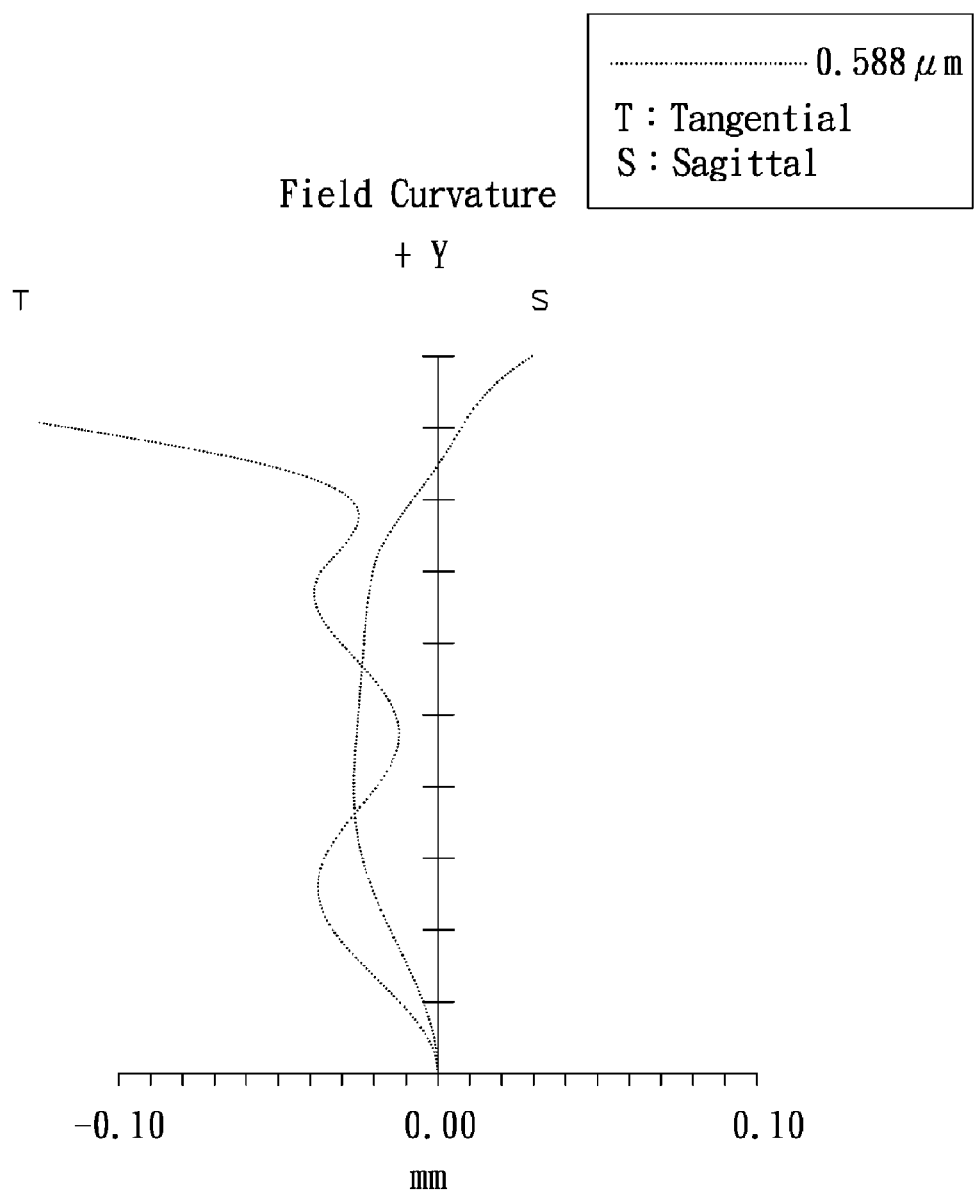
FIG. 2B is a field curvature diagram of a zoom lens at wide-angle end in accordance with a first embodiment of the invention.
Figure 2C:
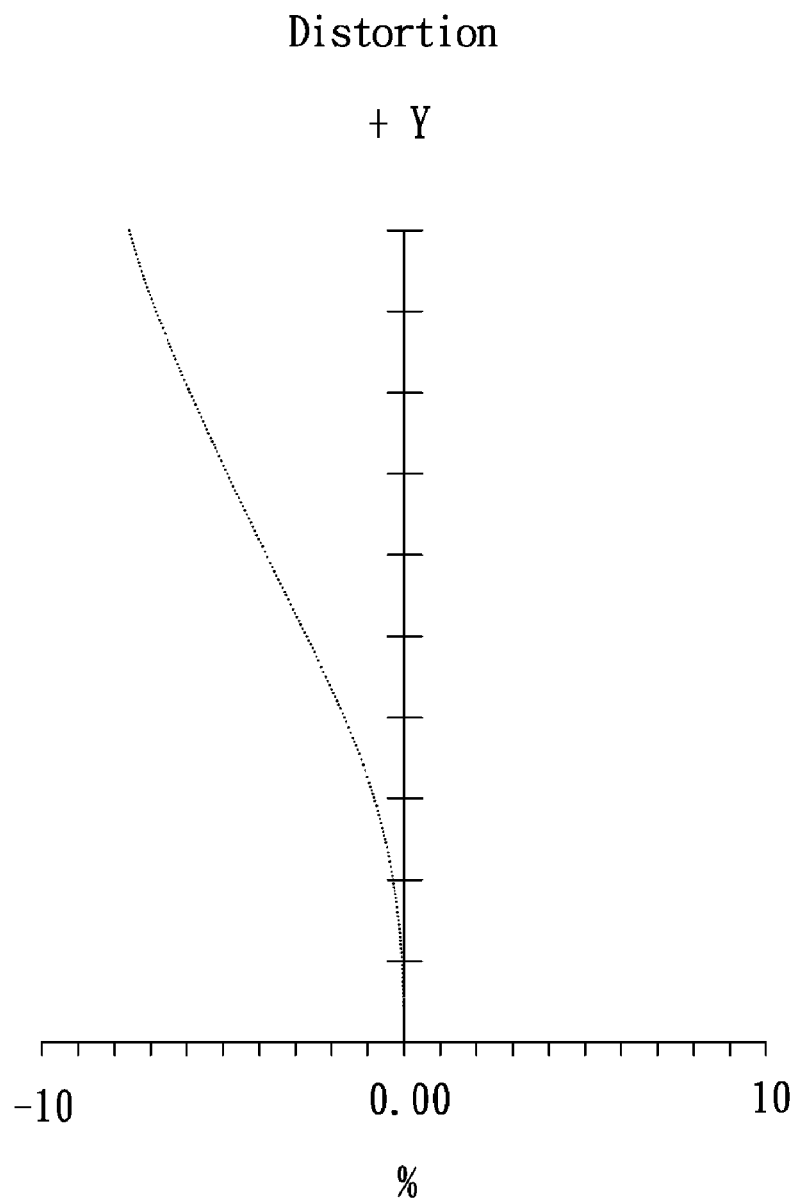
FIG. 2C is a distortion diagram of a zoom lens at wide-angle end in accordance with a first embodiment of the invention.
Figure 2D:
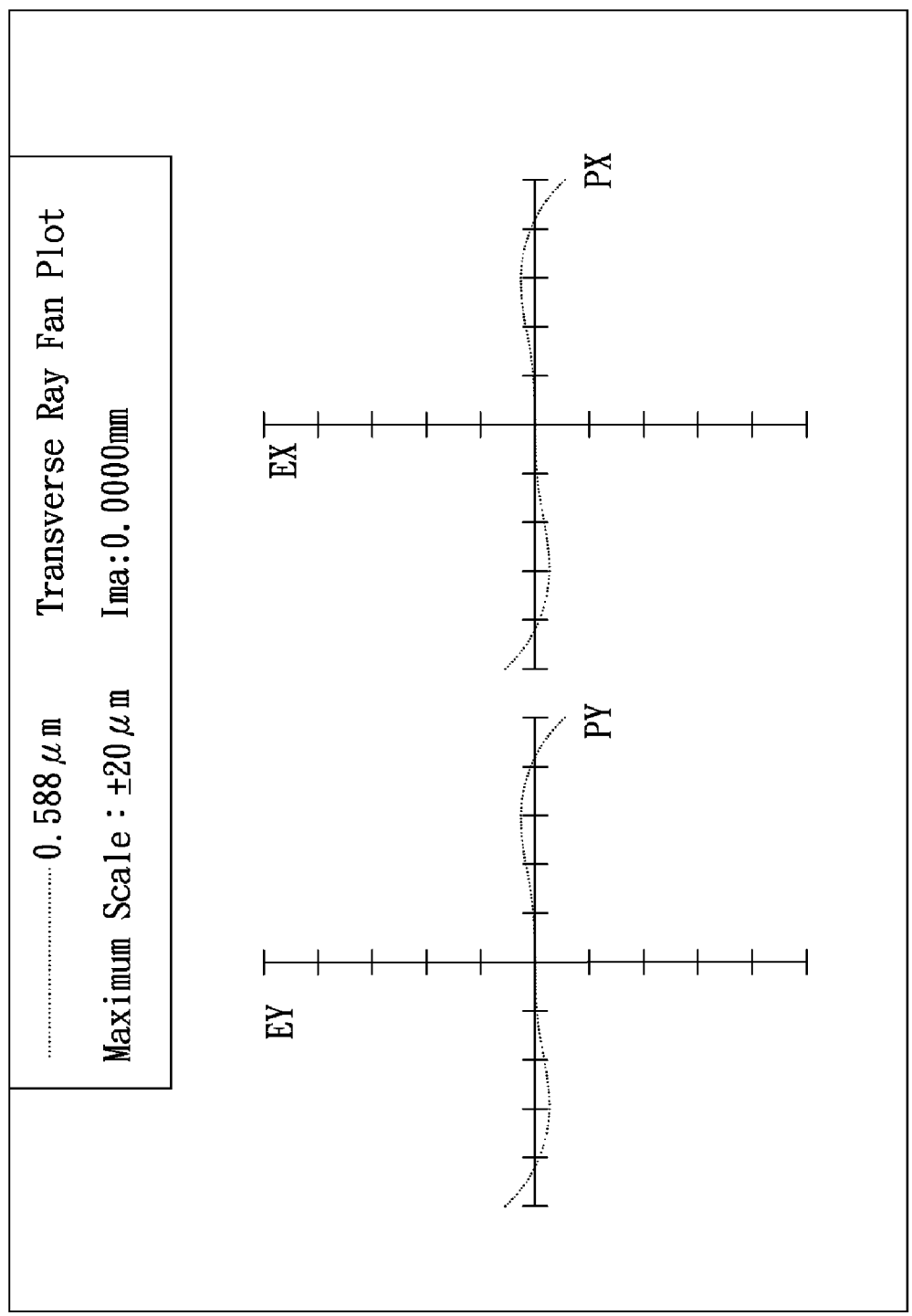
FIG. 2D is a transverse ray fan diagram of a zoom lens at wide-angle end in accordance with a first embodiment of the invention.
Figure 2E:
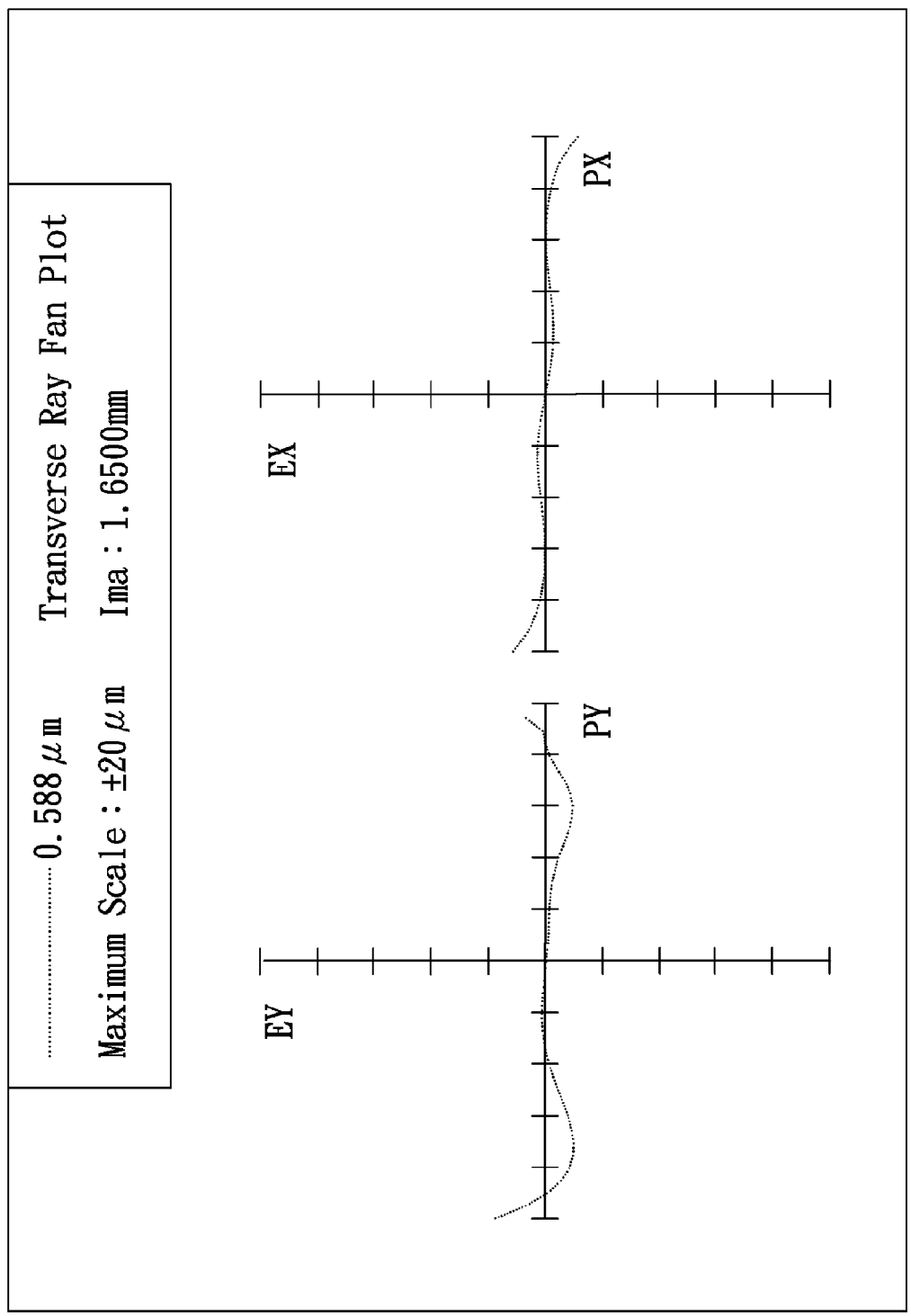
FIG. 2E is a transverse ray fan diagram of a zoom lens at wide-angle end in accordance with a first embodiment of the invention.
Figure 2F:
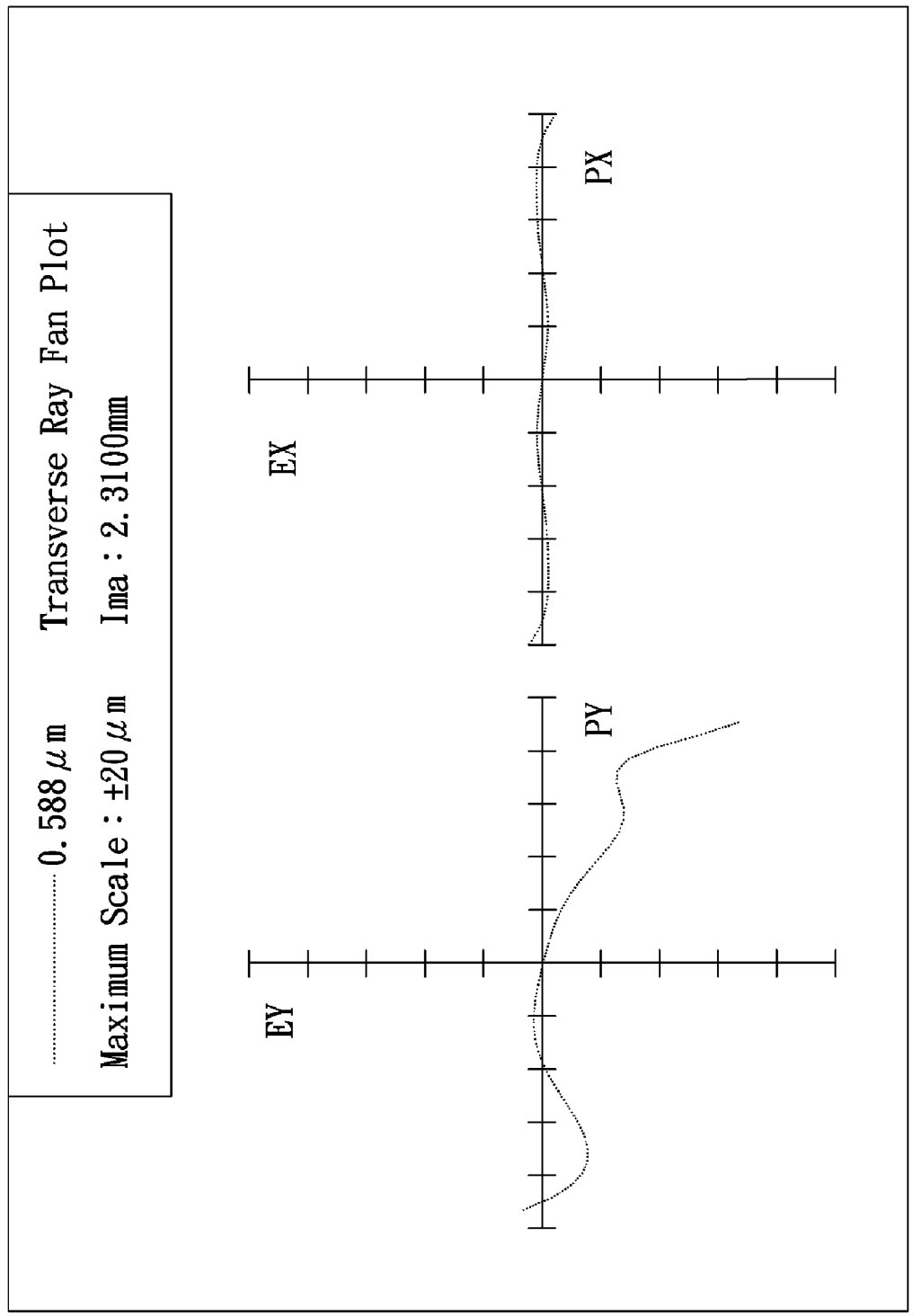
FIG. 2F is a transverse ray fan diagram of a zoom lens at wide-angle end in accordance with a first embodiment of the invention.
Figure 3A:
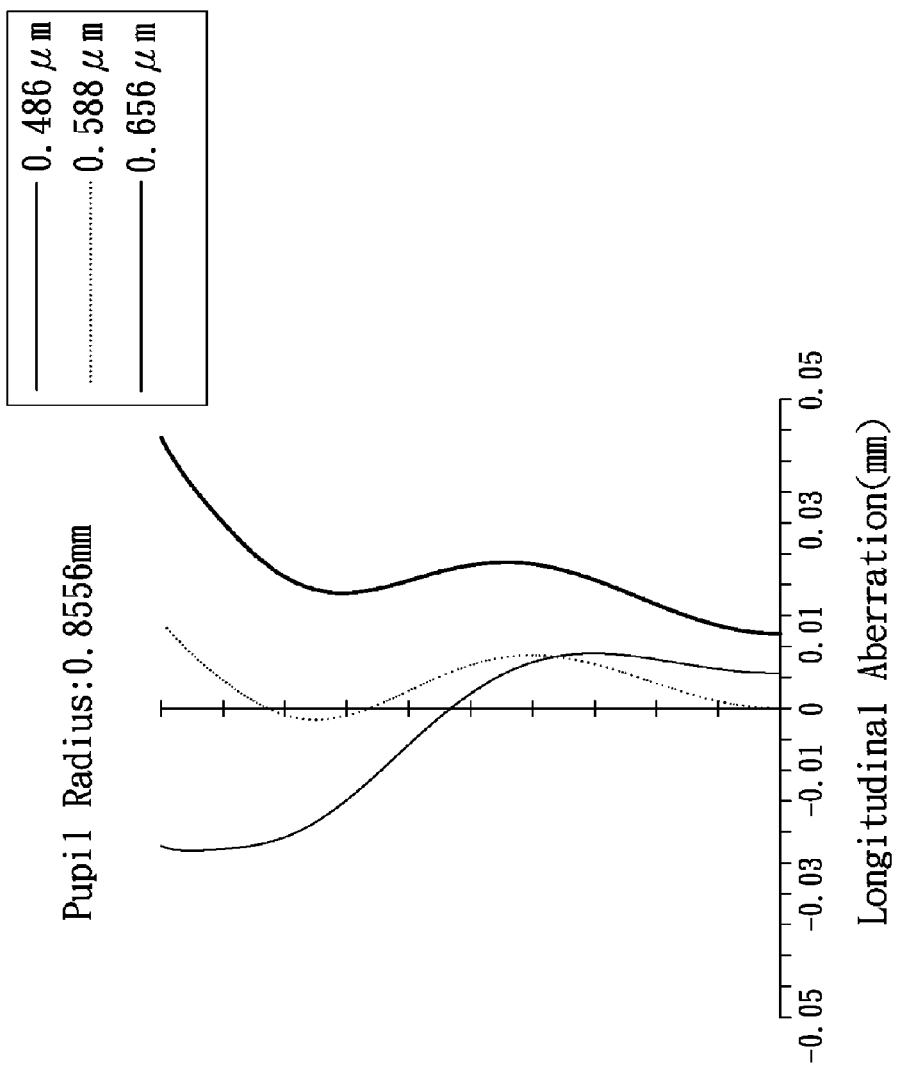
FIG. 3A is a longitudinal aberration diagram of a zoom lens at medium end in accordance with a first embodiment of the invention.
Figure 3B:
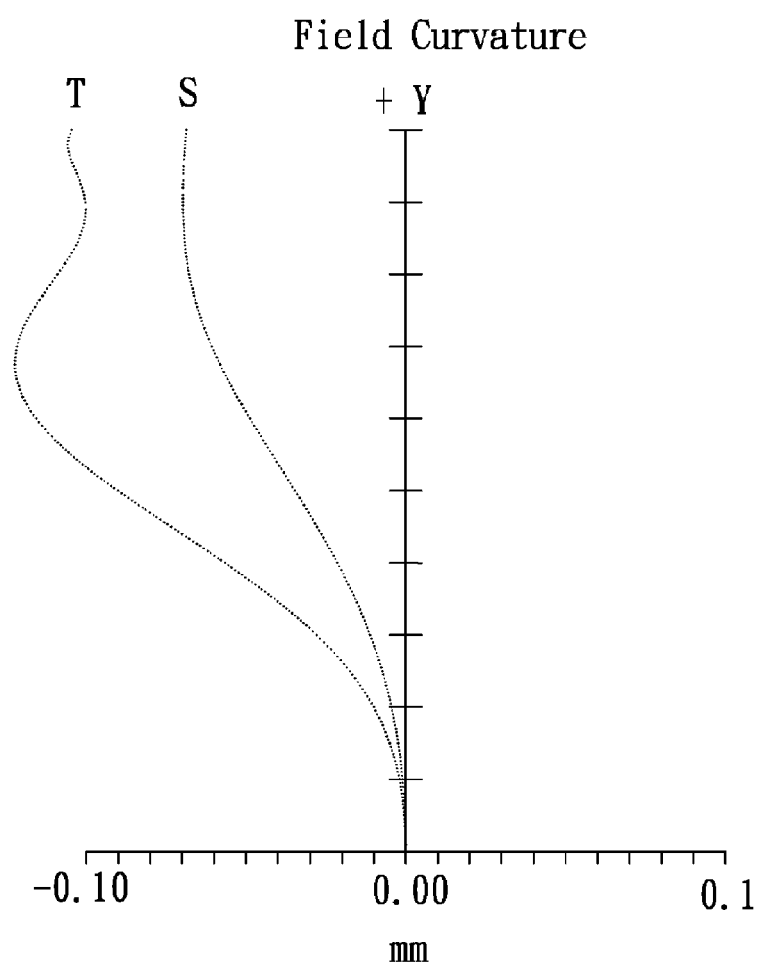
FIG. 3B is a field curvature diagram of a zoom lens at medium end in accordance with a first embodiment of the invention.
Figure 3C:
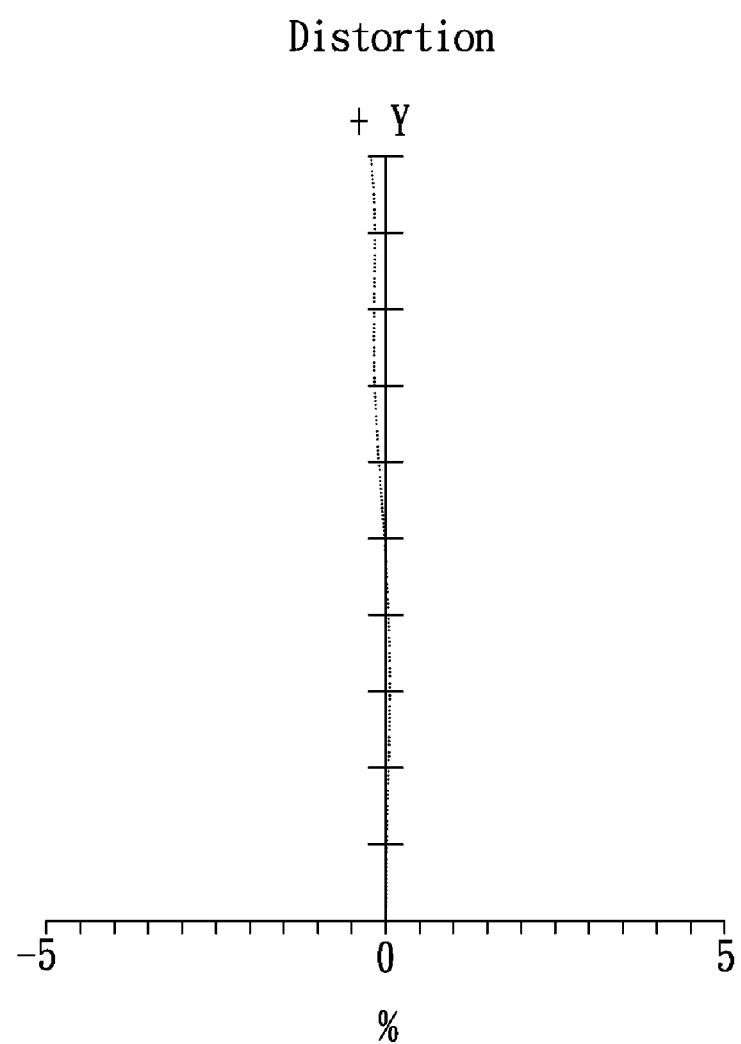
FIG. 3C is a distortion diagram of a zoom lens at medium end in accordance with a first embodiment of the invention.
Figure 3D:
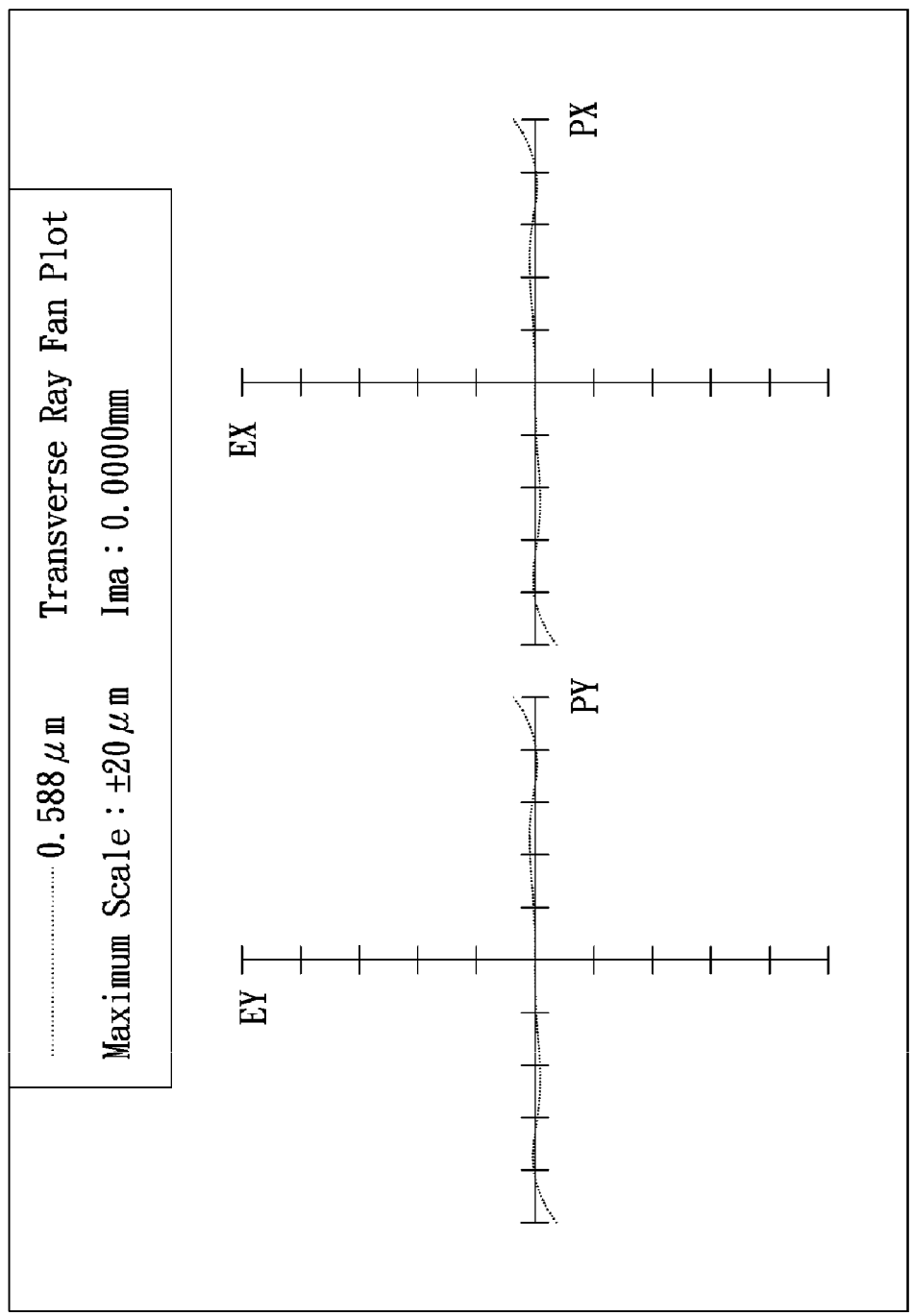
FIG. 3D is a transverse ray fan diagram of a zoom lens at medium end in accordance with a first embodiment of the invention.
Figure 3E:
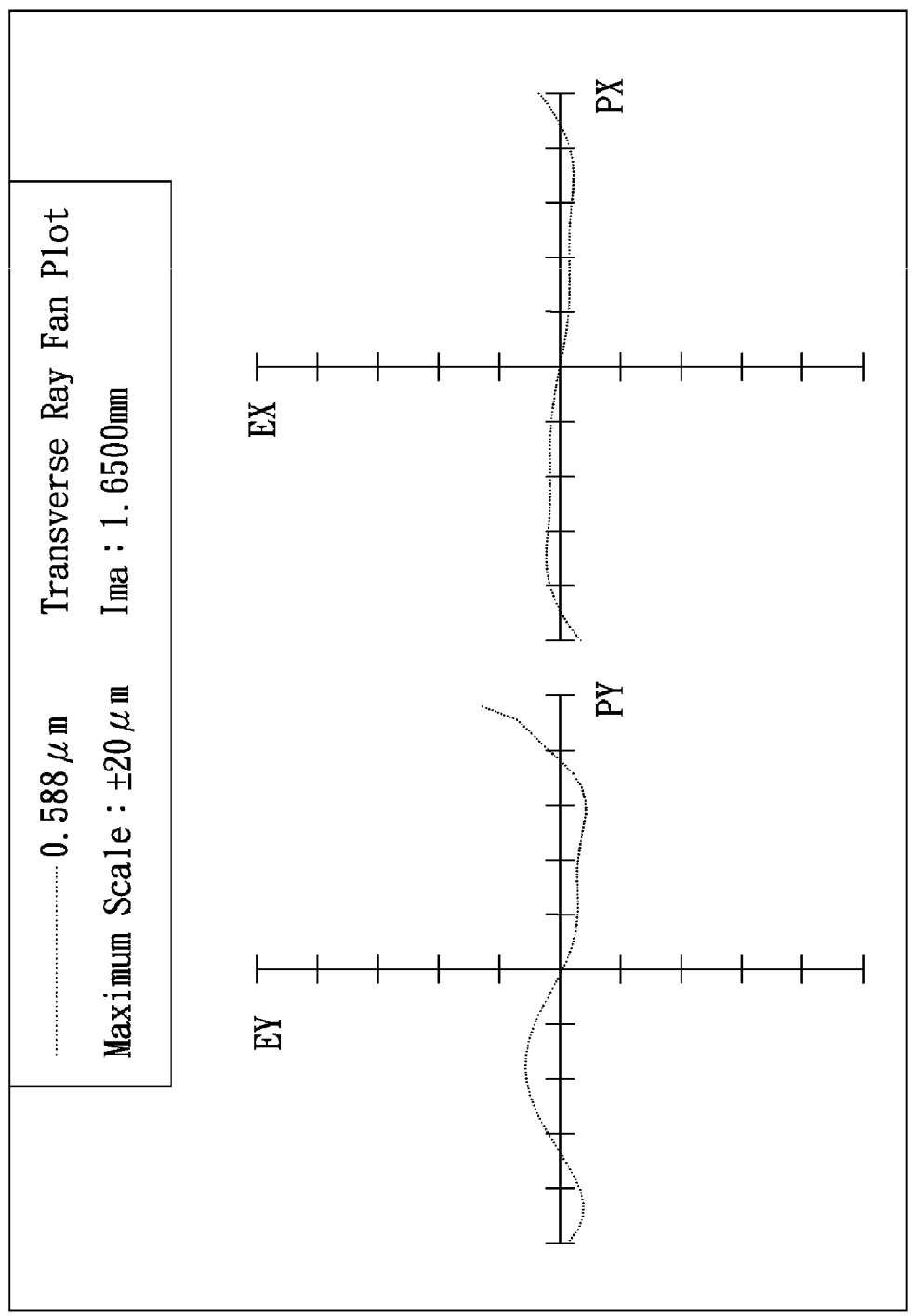
FIG. 3E is a transverse ray fan diagram of a zoom lens at medium end in accordance with a first embodiment of the invention.
Figure 3F:
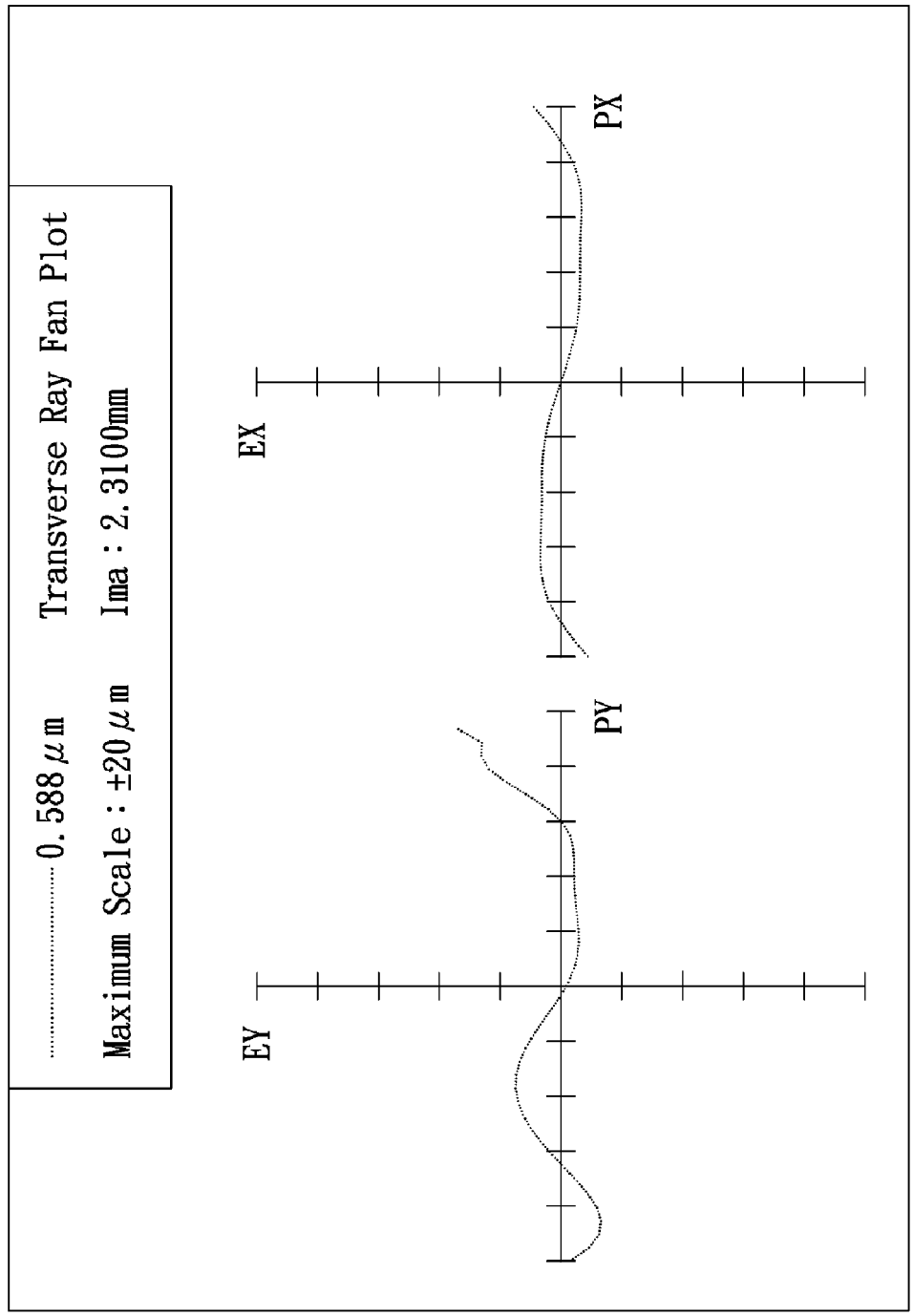
FIG. 3F is a transverse ray fan diagram of a zoom lens at medium end in accordance with a first embodiment of the invention.
Figure 4A:
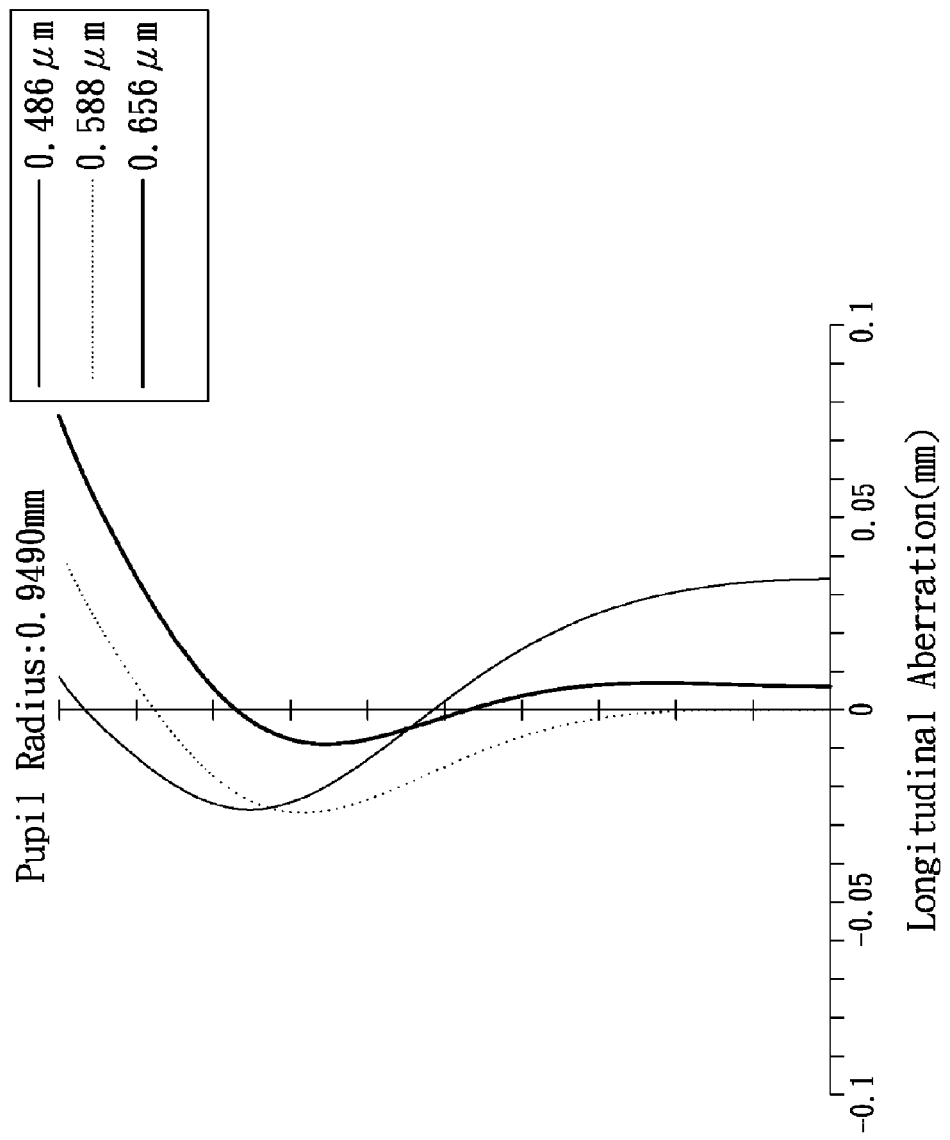
FIG. 4A is a longitudinal aberration diagram of a zoom lens at telephoto end in accordance with a first embodiment of the invention.
Figure 4B:
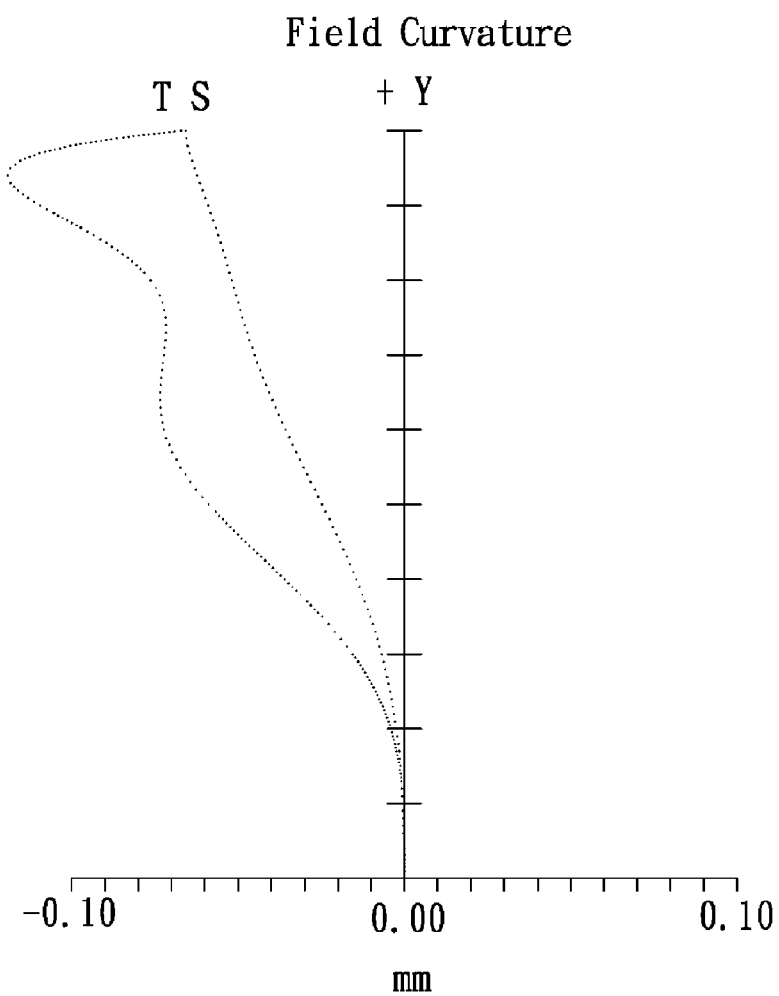
FIG. 4B is a field curvature diagram of a zoom lens at telephoto end in accordance with a first embodiment of the invention.
Figure 4C:
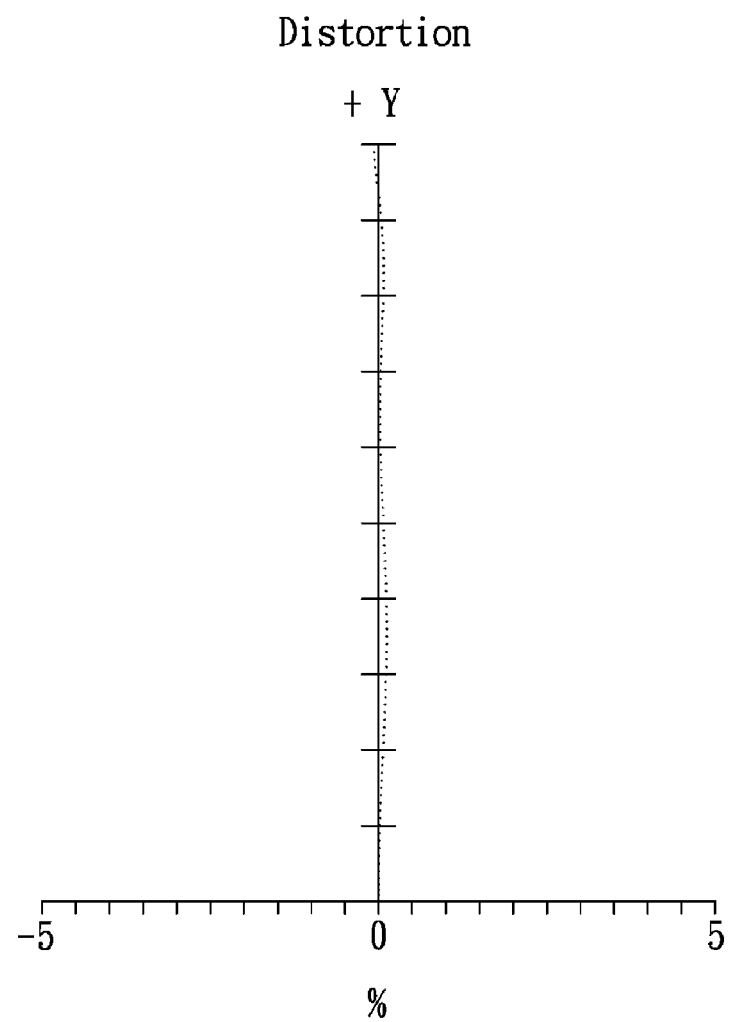
FIG. 4C is a distortion diagram of a zoom lens at telephoto end in accordance with a first embodiment of the invention.
Figure 4D:
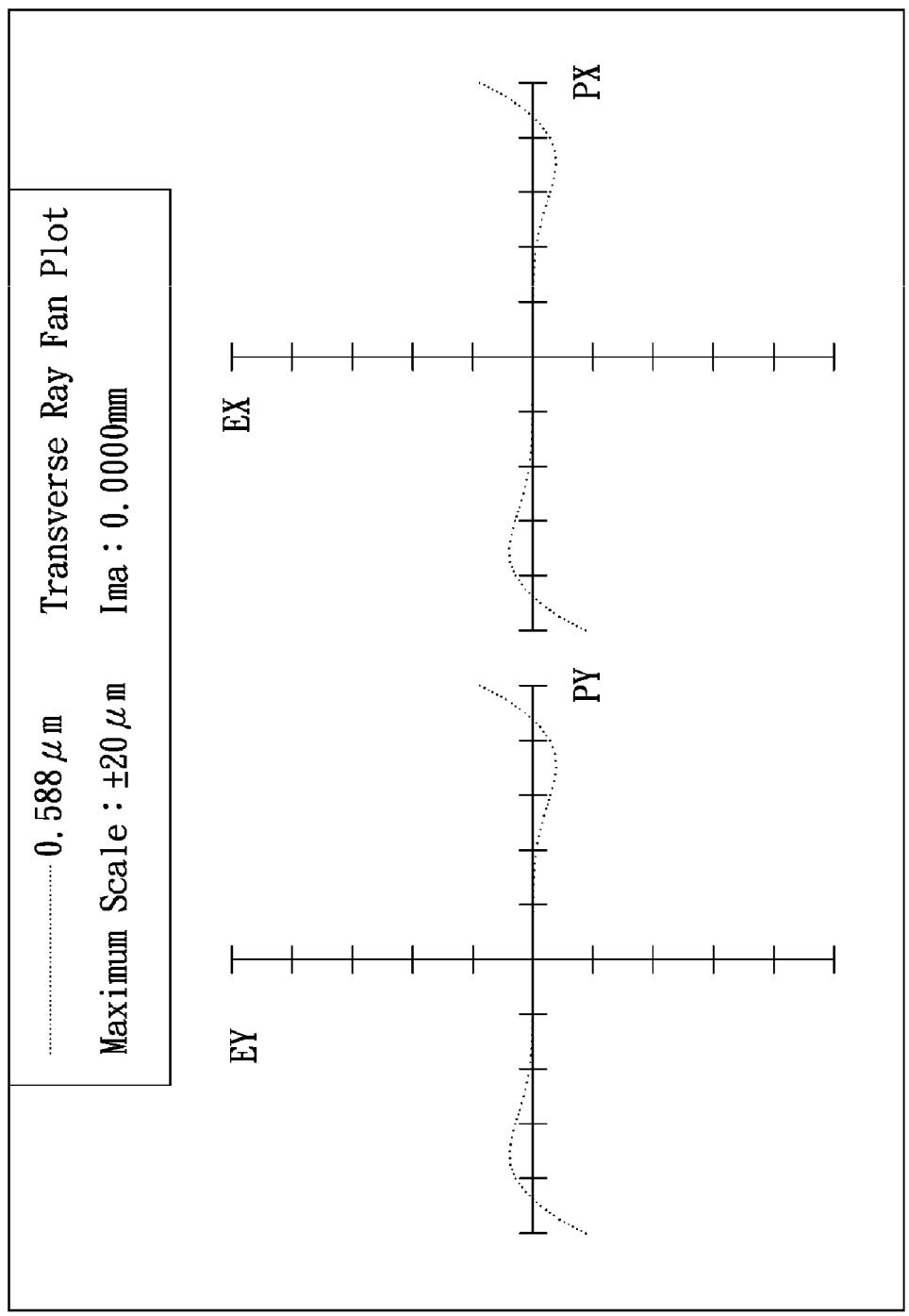
FIG. 4D is a transverse ray fan diagram of a zoom lens at telephoto end in accordance with a first embodiment of the invention.
Figure 4E:
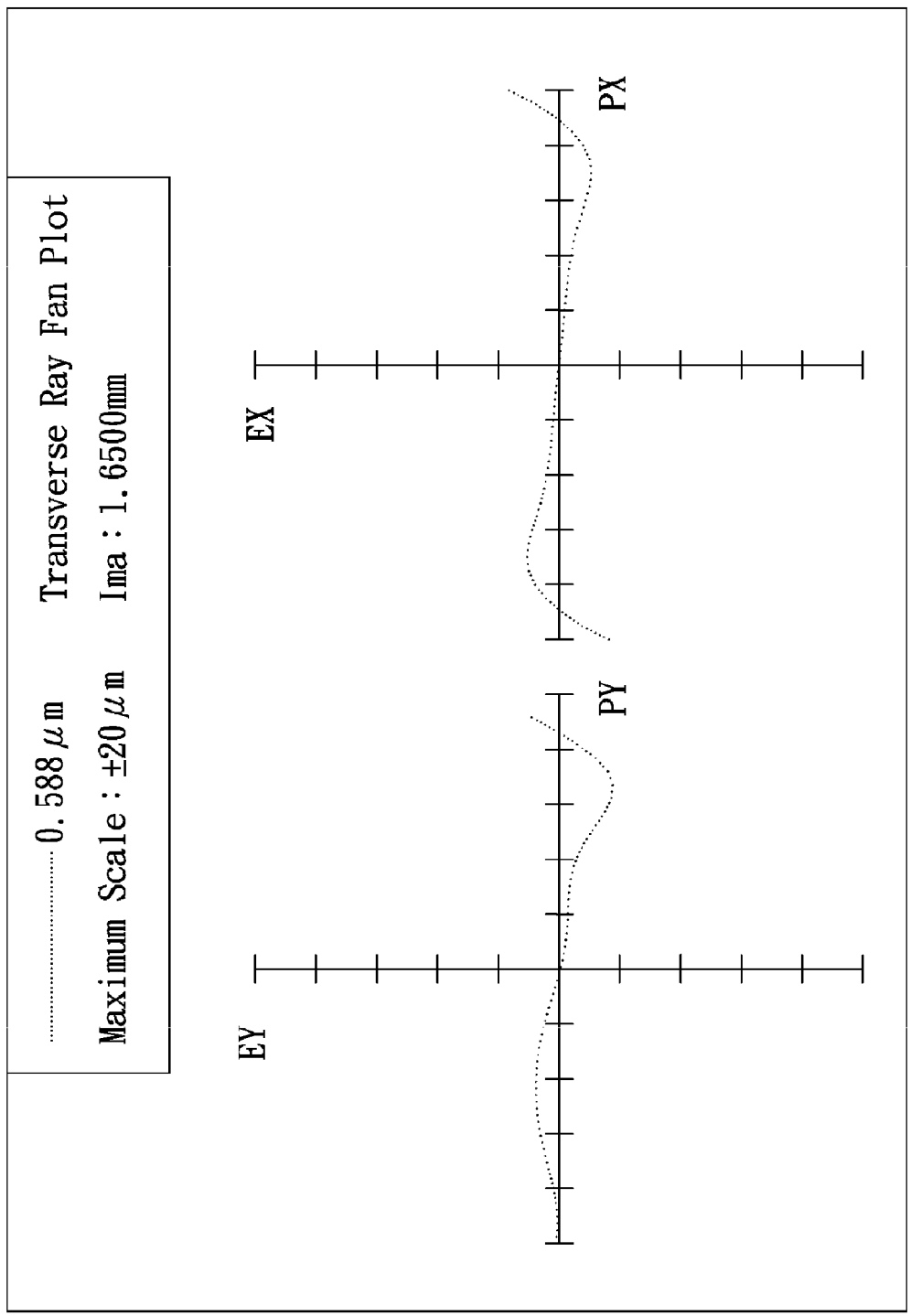
FIG. 4E is a transverse ray fan diagram of a zoom lens at telephoto end in accordance with a first embodiment of the invention.
Figure 4F:
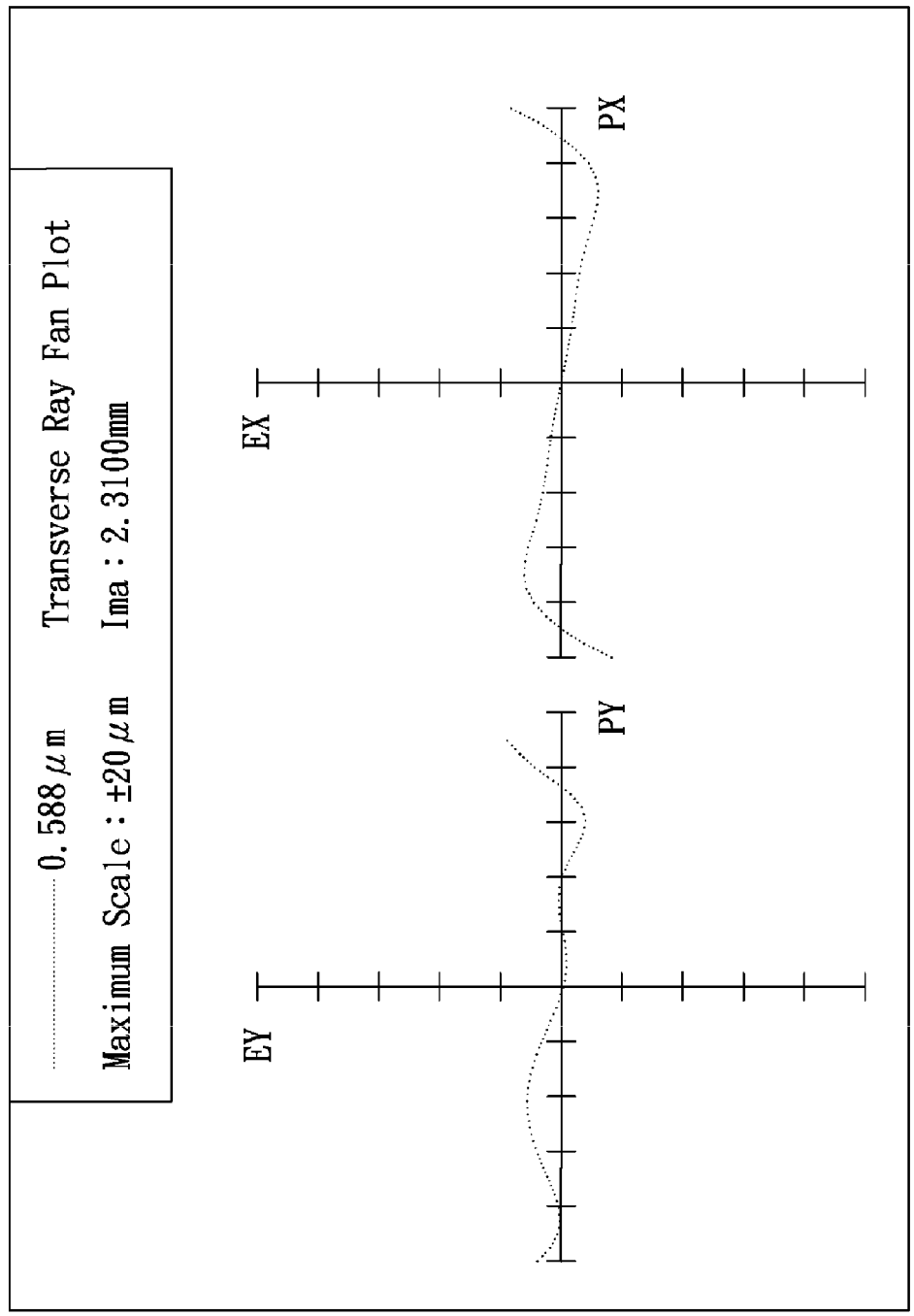
FIG. 4F is a transverse ray fan diagram of a zoom lens at telephoto end in accordance with a first embodiment of the invention.
Figure 4G:
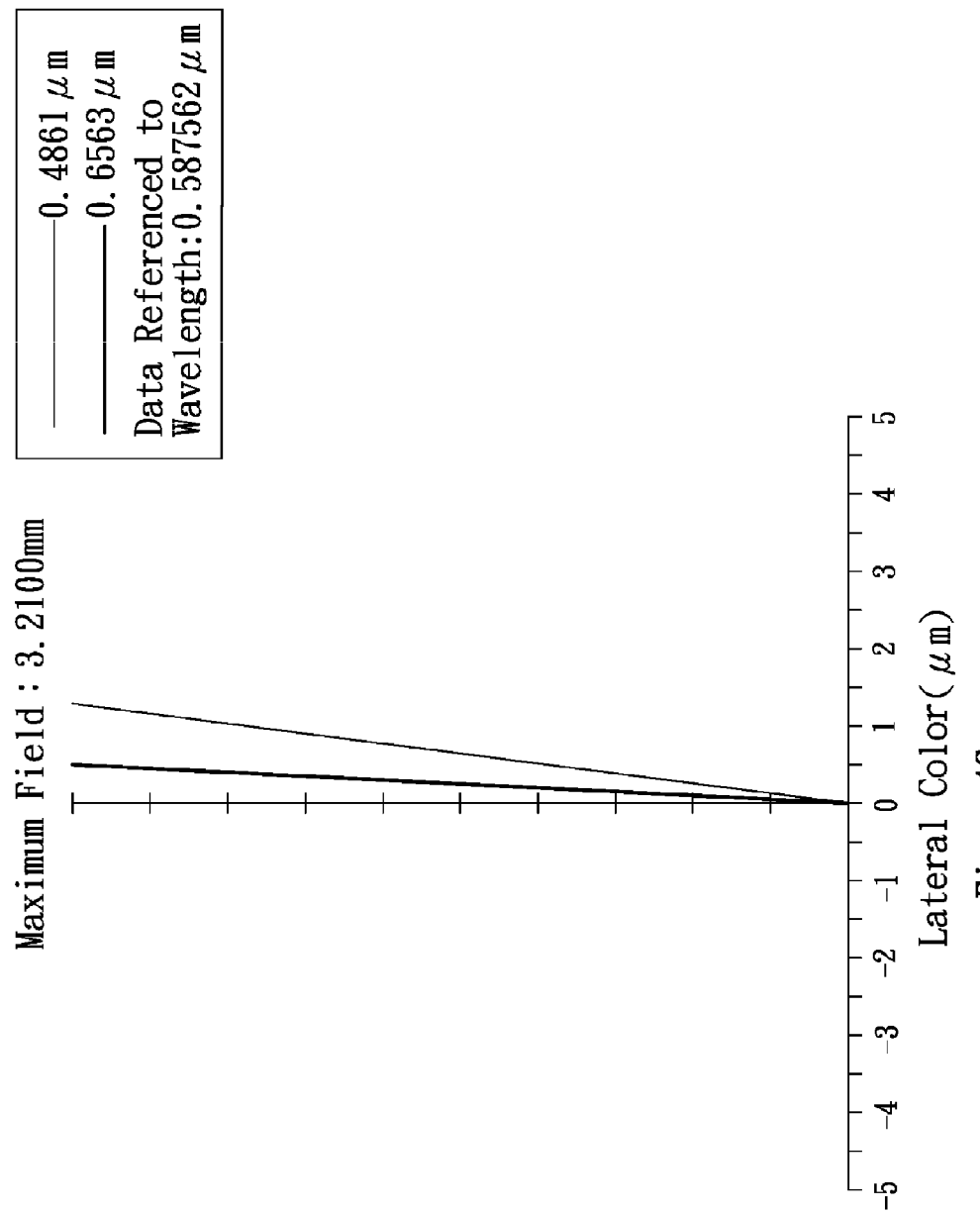
FIG. 4G is a lateral color diagram of a zoom lens at telephoto end in accordance with a first embodiment of the invention.

By the above arrangements of the lenses and stop ST1, the zoom lens 1 of the present embodiment at the wide-angle end, medium end and telephoto end can meet the requirements of optical performance as seen in FIGS. 2A-2G, FIGS. 3A-3G and FIGS. 4A-4G wherein FIG. 2A, FIG. 3A and FIG. 4A show the longitudinal aberration diagram of the zoom lens 1 of the present embodiment at the wide-angle end, medium end and telephoto end, FIG. 2B, FIG. 3B and FIG. 4B show the field curvature diagram of the zoom lens 1 of the present embodiment at the wide-angle end, medium end and telephoto end, FIG. 2C, FIG. 3C and FIG. 4C show the distortion diagram of the zoom lens 1 of the present embodiment at the wide-angle end, medium end and telephoto end, FIGS. 2D-2F, FIGS. 3D-3F and FIGS. 4D-4F show the transverse ray fan diagram of the zoom lens 1 of the present embodiment at the wide-angle end, medium end and telephoto end, and FIG. 2G, FIG. 3G and FIG. 4G show the lateral color diagram of the zoom lens 1 of the present embodiment at the wide-angle end, medium end and telephoto end.

It can be seen from FIG. 2A that the longitudinal aberration in the zoom lens 1 of the present embodiment at the wide-angle end ranges between −0.06 mm and 0.04 mm for the wavelength of 0.486 μm, 0.588 μm, and 0.656 μm. It can be seen from FIG. 2B that the field curvature of tangential direction and sagittal direction in the zoom lens 1 of the present embodiment at the wide-angle end ranges between −0.13 mm and 0.04 mm for the wavelength of 0.588 μm. It can be seen from FIG. 2C that the distortion in the zoom lens 1 of the present embodiment at the wide-angle end does not exceed plus or minus 8.0% for the wavelength of 0.588 μm. It can be seen from FIG. 2D, FIG. 2E and FIG. 2F that the transverse ray aberration of different image highs in the zoom lens 1 of the present embodiment at the wide-angle end does not exceed plus or minus 14 μm for the wavelength of 0.588 μm. It can be seen from FIG. 2G that the lateral color of different fields with reference wavelength is equal to 0.587562 μm in the zoom lens 1 of the present embodiment at the wide-angle end ranges between −2.0 μm and 2.5 μm for the wavelength of 0.4861 μm and 0.6563 μm. It is obvious that the longitudinal aberration, the field curvature, the distortion, the transverse ray aberration and the lateral color of the zoom lens 1 of the present embodiment at the wide-angle end can be corrected effectively, thereby capable of obtaining good optical performance.

It can be seen from FIG. 3A that the longitudinal aberration in the zoom lens 1 of the present embodiment at the medium end ranges between −0.025 mm and 0.045 mm for the wavelength of 0.486 μm, 0.588 μm, and 0.656 μm. It can be seen from FIG. 3B that the field curvature of tangential direction and sagittal direction in the zoom lens 1 of the present embodiment at the medium end ranges between −0.13 mm and 0.00 mm for the wavelength of 0.588 μm. It can be seen from FIG. 3C that the distortion in the zoom lens 1 of the present embodiment at the medium end does not exceed plus or minus 0.5% for the wavelength of 0.588 μm. It can be seen from FIG. 3D, FIG. 3E and FIG. 3F that the transverse ray aberration of different image highs in the zoom lens 1 of the present embodiment at the medium end does not exceed plus or minus 8 μm for the wavelength of 0.588 μm. It can be seen from FIG. 3G that the lateral color of different fields with reference wavelength is equal to 0.587562 μm in the zoom lens 1 of the present embodiment at the medium end ranges between −0.5 μm and 1.5 μm for the wavelength of 0.4861 μm and 0.6563 μm. It is obvious that the longitudinal aberration, the field curvature, the distortion, the transverse ray aberration and the lateral color of the zoom lens 1 of the present embodiment at the medium end can be corrected effectively, thereby capable of obtaining good optical performance.

It can be seen from FIG. 4A that the longitudinal aberration in the zoom lens 1 of the present embodiment at the telephoto end ranges between −0.03 mm and 0.08 mm for the wavelength of 0.486 μm, 0.588 μm, and 0.656 μm. It can be seen from FIG. 4B that the field curvature of tangential direction and sagittal direction in the zoom lens 1 of the present embodiment at the telephoto end ranges between −0.13 mm and 0.00 mm for the wavelength of 0.588 μm. It can be seen from FIG. 4C that the distortion in the zoom lens 1 of the present embodiment at the telephoto end does not exceed plus or minus 0.5% for the wavelength of 0.588 μm. It can be seen from FIG. 4D, FIG. 4E and FIG. 4F that the transverse ray aberration of different image highs in the zoom lens 1 of the present embodiment at the telephoto end does not exceed plus or minus 8 μm for the wavelength of 0.588 μm. It can be seen from FIG. 4G that the lateral color of different fields with reference wavelength is equal to 0.587562 μm in the zoom lens 1 of the present embodiment at the telephoto end ranges between 0.0 μm and 1.5 μm for the wavelength of 0.4861 μm and 0.6563 μm. It is obvious that the longitudinal aberration, the field curvature, the distortion, the transverse ray aberration and the lateral color of the zoom lens 1 of the present embodiment at the telephoto end can be corrected effectively, thereby capable of obtaining good optical performance.

Figure 5:
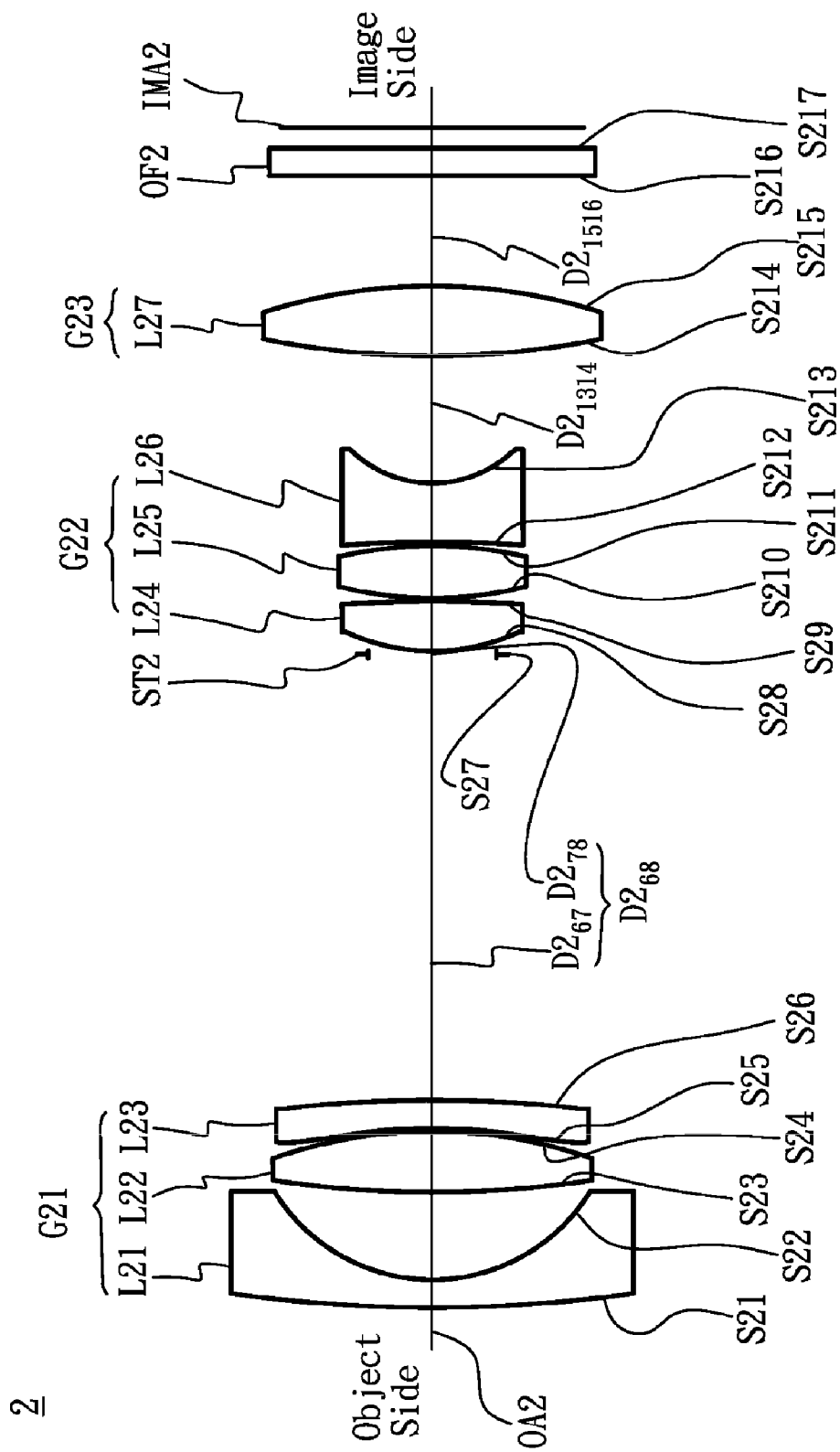
FIG. 5 is a lens layout diagram of a zoom lens at wide-angle end in accordance with a second embodiment of the invention.

Referring to FIG. 5, FIG. 5 is a lens layout diagram of a zoom lens at wide-angle end in accordance with a second embodiment of the invention. The zoom lens 2 includes a first lens group G21, a stop ST2, a second lens group G22, a third lens group G23 and an optical filter OF2, all of which are arranged in sequence from an object side to an image side along an optical axis OA2. The first, second and third lens groups G21, G22 and G23 are moved when the zoom lens 2 zooms from a wide-angle end to a telephoto end. Specifically, the second lens group G22 is moved toward the object side, the first lens group G21 is moved toward the image side and then toward the object side so that an interval $D2_{68}$ between the first lens group G21 and the second lens group G22 decreases, and the third lens group G23 is moved so that an interval $D2_{1314}$ between the second lens group G22 and the third lens group G23 varies. Therefore, an effective focal length of the zoom lens 2 is adjustable by means of changing intervals $D2_{68}$, $D2_{1314}$ of the lens groups when the zoom lens 2 is in use.

In the present embodiment, the first lens group G21 is with negative refractive power, the second lens group G22 is with positive refractive power and the third lens group G23 is with positive refractive power.

The first lens group G21 includes a first lens L21, a second lens L22 and a third lens L23, all of which are arranged in sequence from the object side to the image side along the optical axis OA2. The first lens L21 is a convex-concave lens and with negative refractive power. The object side surface S21 of the first lens L21 is a convex surface. The second lens L22 is a biconvex lens and with positive refractive power. The third lens L23 is a concave-convex lens and with negative refractive power. The object side surface S25 of the third lens L23 is a concave surface and the concave surface is an aspheric surface.

The second lens group G22 includes a fourth lens L24, a fifth lens L25 and a sixth lens L26, all of which are arranged in sequence from the object side to the image side along the optical axis OA2. The fourth lens L24 is a biconvex lens and with positive refractive power. The object side surface S28 and the image side surface S29 of the fourth lens L24 are aspheric surfaces. The fifth lens L25 is a biconvex lens and with positive refractive power. The fourth lens L24 and the fifth lens L25 are separated by an air gap. The sixth lens L26 is a biconcave lens and with negative refractive power. The image side surface S213 of the sixth lens L26 is an aspheric surface.

The third lens group G23 includes a seventh lens L27. The seventh lens L27 is a biconvex lens and with positive refractive power. The object side surface S214 of the seventh lens L27 is an aspheric surface. The seventh lens L27 is moved toward the object side when the zoom lens 2 focuses in short distance photography.

An interval $D2_{78}$ between the stop ST2 and the second lens group G22 is stationary. The optical filter OF2 is a glass plate and includes an object side surface S216 and an image side surface S217. Both of the object side surface S216 and the image side surface S217 are plane surfaces.

In order to maintain good optical performance of the zoom lens 2 in accordance with the present embodiment, the zoom lens 2 must satisfies the following four conditions:

$$|R2_{31}/R2_{32}| \leq 0.39 \quad (5)$$

$$0.30 \leq (f2_{G1} \times f2_{G2})/(f2_3 \times f2_4) \leq 0.75 \quad (6)$$

$$1.24 \leq |f2_{G1}/f2_{G2}| \leq 1.27 \quad (7)$$

$$1.66 \leq (f2_w \times L2_T)/(f2_T \times Y2) \leq 3.08 \quad (8)$$

wherein $R2_{31}$ is the radius of curvature of the object side surface S25 of the third lens L23, $R2_{32}$ is the radius of curvature of the image side surface S26 of the third lens L23, $f2_{G1}$ is the effective focal length of the first lens group G21, $f2_{G2}$ is the effective focal length of the second lens group G22, $f2_3$ is the effective focal length of the third lens L23, $f2_4$ is the effective focal length of the fourth lens L24, $f2_w$ is the effective focal length of the zoom lens 2 at wide-angle end, $f2_T$ is the effective focal length of the zoom lens 2 at telephoto end, Y2 is the largest image height at image plane IMA2 and $L2_T$ is the lens length of the zoom lens 2 at telephoto end.

Due to the above design of the lenses and stop ST2, the zoom lens 2 is miniaturized and provided with a good optical performance.

In order to achieve the above purpose and effectively enhance the optical performance, the zoom lens 2 at the wide-angle end, medium end (not shown) and telephoto end (not shown) of the present embodiment of the invention is provided with the optical specifications shown in Table 3, which include the effective focal length, radius of curvature of each lens surface, thickness between adjacent surface, refractive index of each lens and Abbe number of each lens. Table 3 shows that the effective focal length of the zoom lens 2 at the wide-angle end is equal to 5.26 mm, the effective focal length of the zoom lens 2 at the medium end is equal to 9.74 mm, the effective focal length of the zoom lens 2 at the telephoto end is equal to 14.90 mm, and the zoom ratio of the zoom lens 2 is about 2.83.

TABLE 3

| | W (Wide-angle End) | | Effective Focal Length = 5.26 mm | | |
| | M (Medium End) | | Effective Focal Length = 9.74 mm | | |
| | T (Telephoto End) | | Effective Focal Length = 14.90 mm | | |

| Surface Number | Radius of Curvature (mm) | Thickness (mm) | Nd | Vd | Remark |
|---|---|---|---|---|---|
| S21 | 41.8010 | 0.800 | 1.78 | 50.0 | The First Lens Group G21 The First Lens L21 |
| S22 | 5.3290 | 2.530 | | | |
| S23 | 31.4895 | 1.750 | 1.58 | 30.2 | The First Lens Group G21 The Second Lens L22 |
| S24 | −13.8962 | 0.100 | | | |
| S25 | −13.5251 | 0.800 | 1.53 | 56.1 | The First Lens Group G21 The Third Lens L23 |
| S26 | −37.8232 | 12.8659 (W) 4.7805 (M) 1.4000 (T) | | | Interval $D2_{67}$ |
| S27 | ∞ | 0.100 | | | Stop ST2 |
| S28 | 5.8928 | 1.430 | 1.53 | 56.1 | The Second Lens Group G22 The Fourth Lens L24 |
| S29 | −26.4299 | 0.100 | | | |
| S210 | 11.1850 | 1.500 | 1.68 | 50.8 | The Second Lens Group G22 The Fifth Lens L25 |
| S211 | −12.0710 | 0.110 | | | |
| S212 | −37.1199 | 1.709 | 1.62 | 25.6 | The Second Lens Group G22 The Sixth Lens L26 |
| S213 | 3.4100 | 3.6673 (W) 8.8401 (M) 14.4171 (T) | | | Interval $D2_{1314}$ |
| S214 | 22.8880 | 2.000 | 1.53 | 56.1 | The Third Lens Group G23 The seventh Lens L27 |
| S215 | −16.2980 | 3.1900 (W) 2.8758 (M) 2.6860 (T) | | | Interval $D2_{1516}$ |
| S216 | ∞ | 0.800 | 1.51633 | 64.142 | Optical Filter OF2 |
| S217 | ∞ | 0.590 | | | |

The aspheric surface sag z of each lens in table 3 can be calculated by the following formula:

$$z = ch^2/\{1+[1-(k+1)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F and G are aspheric coefficients.

In the present embodiment, the conic constant k and the aspheric coefficients A, B, C, D, E, F, G of each surface are shown in Table 4.

TABLE 4

| Surface Number | S25 | S28 | S29 | S213 | S214 |
|---|---|---|---|---|---|
| K | 0 | 0 | 0 | 0 | 0 |
| A | 0.00063396 | −0.000955707 | 0.000781741 | −0.000801003 | −0.000170575 |
| B | −3.99151E−05 | 0.000450011 | 0.000414177 | 0.000187631 | 3.04389E−05 |
| C | 9.35125E−06 | −0.000207934 | −0.000175624 | −0.00011129 | −3.192E−06 |
| D | −8.71098E−07 | 5.34925E−05 | 3.89966E−05 | 1.80933E−05 | 1.5797E−07 |
| E | 4.08224E−08 | −6.81096E−06 | −3.31827E−06 | 0 | −2.96385E−09 |
| F | −7.14667E−10 | 3.43834E−07 | 2.57295E−08 | 0 | 0 |
| G | 4.33624E−13 | 0 | 0 | 0 | 0 |

For the zoom lens 2 of the present embodiment, the radius of curvature $R2_{31}$ of the object side surface S25 of the third lens L23 is equal to −13.5250 mm, the radius of curvature $R2_{32}$ of the image side surface S26 of the third lens L23 is equal to −37.8232 mm, the effective focal length $f2_{G1}$ of the first lens group G21 is equal to −12.819 mm, the effective focal length $f2_{G2}$ of the second lens group G22 is equal to 10.160 mm, the effective focal length $f2_3$ of the third lens L23 is equal to −39.809 mm, the effective focal length $f2_4$ of the fourth lens L24 is equal to 9.148 mm, the effective focal length $f2_w$ of the zoom lens 2 at wide-angle end is equal to 5.264 mm, the effective focal length $f2_T$ of the zoom lens 2 at telephoto end is equal to 14.896 mm, the largest image height Y2 at image plane IMA2 is equal to 4.07 mm, and the lens length $L2_T$ of the zoom lens 2 at telephoto end is equal to 32.822 mm. According to the above data, the following values can be obtained:

$|R2_{31}/R2_{32}| = 0.358$, $(f2_{G1} \times f2_{G2})/(f2_3 \times f2_4) = 0.358$, $|f2_{G1}/f2_{G2}| = 1.262$, $(f2_w \times L2_T)/(f2_T \times Y2) = 2.850$, which respectively satisfy the above conditions (5)-(8).

By the above arrangements of the lenses and stop ST2, the zoom lens 2 of the present embodiment at the wide-angle end, medium end (not shown) and telephoto end (not shown) can meet the requirements of optical performance, wherein the longitudinal aberration, the field curvature, the distortion, the transverse ray aberration and the lateral color (the above figures are similar to the figures of the first embodiment, therefore are omitted) can be corrected effectively, thereby capable of obtaining good optical performance.

Figure 6:
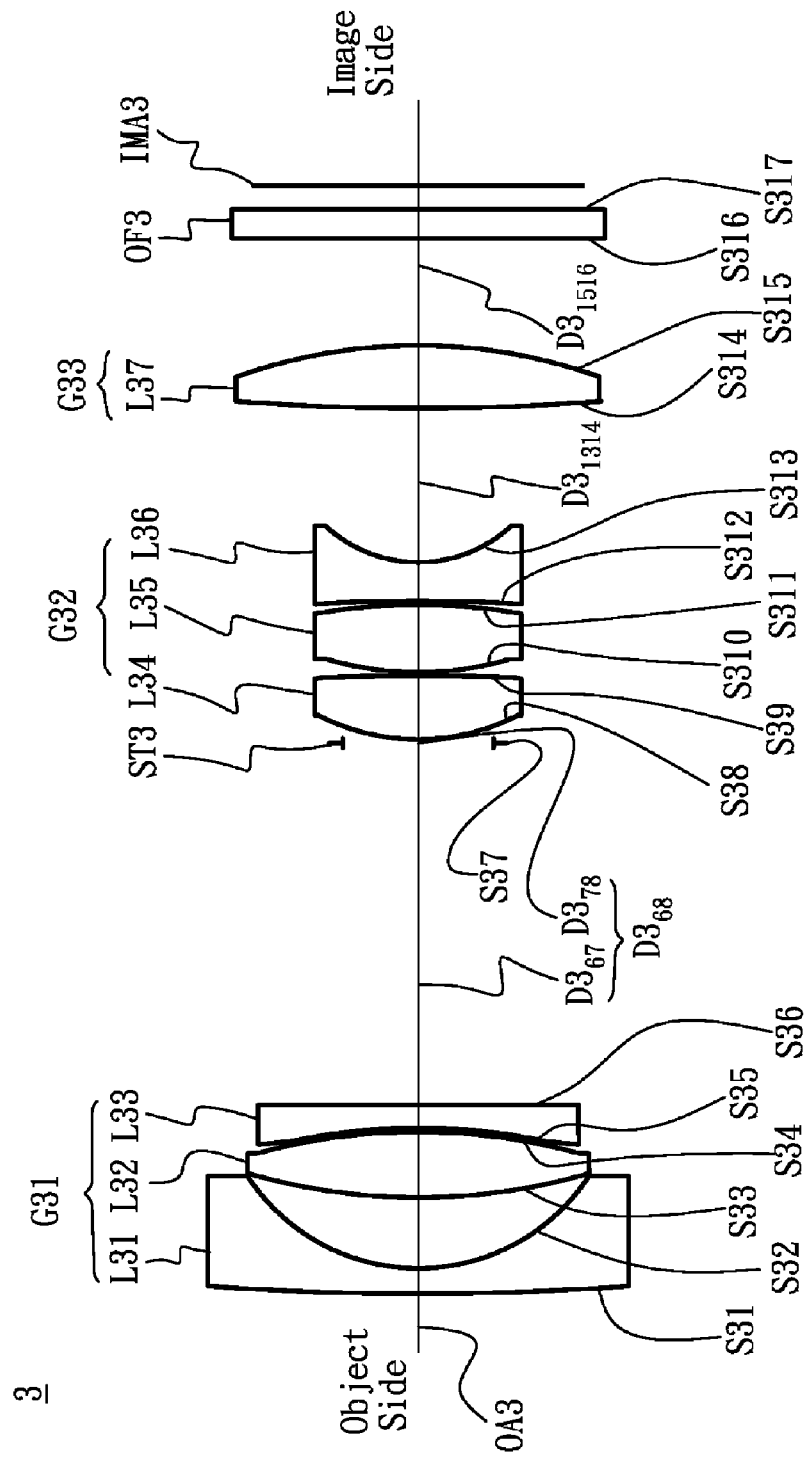
FIG. 6 is a lens layout diagram of a zoom lens at wide-angle end in accordance with a third embodiment of the invention.

Referring to FIG. 6, FIG. 6 is a lens layout diagram of a zoom lens at wide-angle end in accordance with a third embodiment of the invention. The zoom lens 3 includes a first lens group G31, a stop ST3, a second lens group G32, a third lens group G33 and an optical filter OF3, all of which are arranged in sequence from an object side to an image side along an optical axis OA3. The first, second and third lens groups G31, G32 and G33 are moved when the zoom lens 3 zooms from a wide-angle end to a telephoto end. Specifically, the second lens group G32 is moved toward the object side, the first lens group G31 is moved toward the image side and then toward the object side so that an interval $D3_{68}$ between the first lens group G31 and the second lens group G32 decreases, and the third lens group G33 is moved so that an interval $D3_{1314}$ between the second lens group G32 and the third lens group G33 varies. Therefore, an effective focal length of the zoom lens 3 is adjustable by means of changing intervals $D3_{68}$, $D3_{1314}$ of the lens groups when the zoom lens 3 is in use.

In the present embodiment, the first lens group G31 is with negative refractive power, the second lens group G32 is with positive refractive power and the third lens group G33 is with positive refractive power.

The first lens group G31 includes a first lens L31, a second lens L32 and a third lens L33, all of which are arranged in sequence from the object side to the image side along the optical axis OA3. The first lens L31 is a convex-concave lens and with negative refractive power. The object side surface S31 of the first lens L31 is a convex surface. The second lens L32 is a biconvex lens and with positive refractive power. The third lens L33 is a concave-convex lens and with negative refractive power. The object side surface S35 of the third lens L33 is a concave surface and the concave surface is an aspheric surface.

The second lens group G32 includes a fourth lens L34, a fifth lens L35 and a sixth lens L36, all of which are arranged in sequence from the object side to the image side along the optical axis OA3. The fourth lens L34 is a biconvex lens and with positive refractive power. The object side surface S38 and the image side surface S39 of the fourth lens L34 are aspheric surfaces. The fifth lens L35 is a biconvex lens and with positive refractive power. The fourth lens L34 and the fifth lens L35 are separated by an air gap. The sixth lens L36 is a biconcave lens and with negative refractive power. The image side surface S313 of the sixth lens L36 is an aspheric surface.

The third lens group G33 includes a seventh lens L37. The seventh lens L37 is a biconvex lens and with positive refractive power. The image side surface S315 of the seventh lens L37 is an aspheric surface. The seventh lens L37 is moved toward the object side when the zoom lens 3 focuses in short distance photography.

An interval $D3_{78}$ between the stop ST3 and the second lens group G32 is stationary. The optical filter OF3 is a glass plate and includes an object side surface S316 and an image side surface S317. Both of the object side surface S316 and the image side surface S317 are plane surfaces.

In order to maintain good optical performance of the zoom lens 3 in accordance with the present embodiment, the zoom lens 3 must satisfies the following four conditions:

$$|R3_{31}/R3_{32}| \leq 0.39 \tag{9}$$

$$0.30 \leq (f3_{G1} \times f3_{G2})/(f3_3 \times f3_4) \leq 0.75 \tag{10}$$

$$1.24 \leq |f3_{G1}/f3_{G2}| \leq 1.27 \tag{11}$$

$$1.66 \leq (f3_w \times L3_T)/(f3_T \times Y3) \leq 3.08 \tag{12}$$

wherein $R3_{31}$ is the radius of curvature of the object side surface S35 of the third lens L33, $R3_{32}$ is the radius of curvature of the image side surface S36 of the third lens L33, $f3_{G1}$ is the effective focal length of the first lens group G31, $f3_{G2}$ is the effective focal length of the second lens group G32, $f3_3$ is the effective focal length of the third lens L33, $f3_4$ is the effective focal length of the fourth lens L34, $f3_w$ is the effective focal length of the zoom lens 3 at wide-angle end, $f3_T$ is the effective focal length of the zoom lens 3 at telephoto end, Y3 is the largest image height at image plane IMA3 and $L3_T$ is the lens length of the zoom lens 3 at telephoto end.

Due to the above design of the lenses and stop ST3, the zoom lens 3 is miniaturized and provided with a good optical performance.

In order to achieve the above purpose and effectively enhance the optical performance, the zoom lens 3 at the wide-angle end, medium end (not shown) and telephoto end (not shown) of the present embodiment of the invention is provided with the optical specifications shown in Table 5, which include the effective focal length, radius of curvature of each lens surface, thickness between adjacent surface, refractive index of each lens and Abbe number of each lens. Table 5 shows that the effective focal length of the zoom lens 3 at the wide-angle end is equal to 5.15 mm, the effective focal length of the zoom lens 3 at the medium end is equal to 7.97 mm, the effective focal length of the zoom lens 3 at the telephoto end is equal to 14.56 mm, and the zoom ratio of the zoom lens 3 is about 2.83.

TABLE 5

| W (Wide-angle End) | | | Effective Focal Length = 5.15 mm | | |
|---|---|---|---|---|---|
| M (Medium End) | | | Effective Focal Length = 7.97 mm | | |
| T (Telephoto End) | | | Effective Focal Length = 14.56 mm | | |

| Surface Number | Radius of Curvature (mm) | Thickness (mm) | Nd | Vd | Remark |
|---|---|---|---|---|---|
| S31 | 80.3517 | 0.600 | 1.89 | 41.0 | The First Lens Group G31 The First Lens L31 |
| S32 | 5.1152 | 1.800 | | | |
| S33 | 15.4596 | 1.650 | 1.74 | 28.5 | The First Lens Group G31 The Second Lens L32 |
| S34 | −15.5858 | 0.100 | | | |

TABLE 5-continued

| | W (Wide-angle End) | | Effective Focal Length = 5.15 mm | | |
| --- | --- | --- | --- | --- | --- |
| | M (Medium End) | | Effective Focal Length = 7.97 mm | | |
| | T (Telephoto End) | | Effective Focal Length = 14.56 mm | | |

| Surface Number | Radius of Curvature (mm) | Thickness (mm) | Nd | Vd | Remark |
| --- | --- | --- | --- | --- | --- |
| S35 | −12.5861 | 0.600 | 1.59 | 62.0 | The First Lens Group G31 The Third Lens L33 |
| S36 | −280.5606 | 9.0846 (W) 4.6601 (M) 0.7 (T) | | | Interval $D3_{67}$ |
| S37 | ∞ | 0.100 | | | Stop ST3 |
| S38 | 5.3119 | 1.590 | 1.59 | 62.0 | The Second Lens Group G32 The Fourth Lens L34 |
| S39 | −72.9007 | 0.100 | | | |
| S310 | 8.5454 | 1.682 | 1.89 | 41.0 | The Second Lens Group G32 The Fifth Lens L35 |
| S311 | −15.3733 | 0.100 | | | |
| S312 | −43.8698 | 0.991 | 1.83 | 24.0 | The Second Lens Group G32 The Sixth Lens L36 |
| S313 | 3.8474 | 3.8525 (W) 7.0199 (M) 13.4774 (T) | | | Interval $D3_{1314}$ |
| S314 | 60.0000 | 1.600 | 1.59 | 62.0 | The Third Lens Group G33 The seventh Lens L37 |
| S315 | −12.8951 | 2.6803 (W) 2.4023 (M) 2.6767 (T) | | | Interval $D3_{1516}$ |
| S316 | ∞ | 0.720 | 1.51633 | 64.142 | optical Filter OF3 |
| S317 | ∞ | 0.590 | | | |

The aspheric surface sag z of each lens in table 5 can be calculated by the following formula:

$$z = ch^2/\{1+[1-(k+1)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F and G are aspheric coefficients.

In the present embodiment, the conic constant k and the aspheric coefficients A, B, C, D, E, F, G of each surface are shown in Table 6.

TABLE 6

| Surface Number | S35 | S38 | S39 | S313 | S315 |
| --- | --- | --- | --- | --- | --- |
| K | −0.067727194 | −0.001581346 | 0 | 0 | 0 |
| A | 0.000893028 | −0.001142905 | −3.46092E−05 | 0.002307479 | 0.000408082 |
| B | −9.6964E−05 | 0.000175638 | −7.11964E−05 | 0.000377905 | −5.35629E−05 |
| C | 2.86381E−05 | −9.60038E−05 | 0.000121875 | −0.000154326 | 3.27124E−06 |
| D | −4.29759E−06 | 2.55674E−05 | −6.04308E−05 | 3.19407E−05 | −3.99887E−08 |
| E | 3.53802E−07 | −3.99166E−06 | 1.28349E−05 | −7.48753E−07 | −4.38902E−09 |
| F | −1.42766E−08 | 2.75482E−07 | −9.77908E−07 | −1.78854E−07 | 1.40744E−10 |
| G | 2.18704E−10 | 1.78878E−09 | 0 | 0 | 0 |

For the zoom lens 3 of the present embodiment, the radius of curvature $R3_{31}$ of the object side surface S35 of the third lens L33 is equal to −12.5861 mm, the radius of curvature $R3_{32}$ of the image side surface S36 of the third lens L33 is equal to −280.5606 mm, the effective focal length $f3_{G1}$ of the first lens group G31 is equal to −10.314 mm, the effective focal length $f3_{G2}$ of the second lens group G32 is equal to 8.258 mm, the effective focal length $f3_3$ of the third lens L33 is equal to −22.3529 mm, the effective focal length $f3_4$ of the fourth lens L34 is equal to 8.4556 mm, the effective focal length $f3_w$ of the zoom lens 3 at wide-angle end is equal to 5.1469 mm, the effective focal length $f3_T$ of the zoom lens 3 at telephoto end is equal to 14.5647 mm, the largest image height Y3 at image plane IMA3 is equal to 4.07 mm, and the lens length $L3_T$ of the zoom lens 3 at telephoto end is equal to 29.077 mm. According to the above data, the following values can be obtained:

$|R3_{31}/R3_{32}| = 0.045$, $(f3_{G1} \times f3_{G2})/(f3_3 \times f3_4) = 0.451$, $|f3_{G1}/f3_{G2}| = 1.249$, $(f3_w \times L3_T)/(f3_T \times Y3) = 2.525$, which respectively satisfy the above conditions (9)-(12).

By the above arrangements of the lenses and stop ST3, the zoom lens 3 of the present embodiment at the wide-angle end, medium end (not shown) and telephoto end (not shown) can meet the requirements of optical performance, wherein the longitudinal aberration, the field curvature, the distortion, the transverse ray aberration and the lateral color (the above figures are similar to the figures of the first embodiment, therefore are omitted) can be corrected effectively, thereby capable of obtaining good optical performance.

Figure 7:
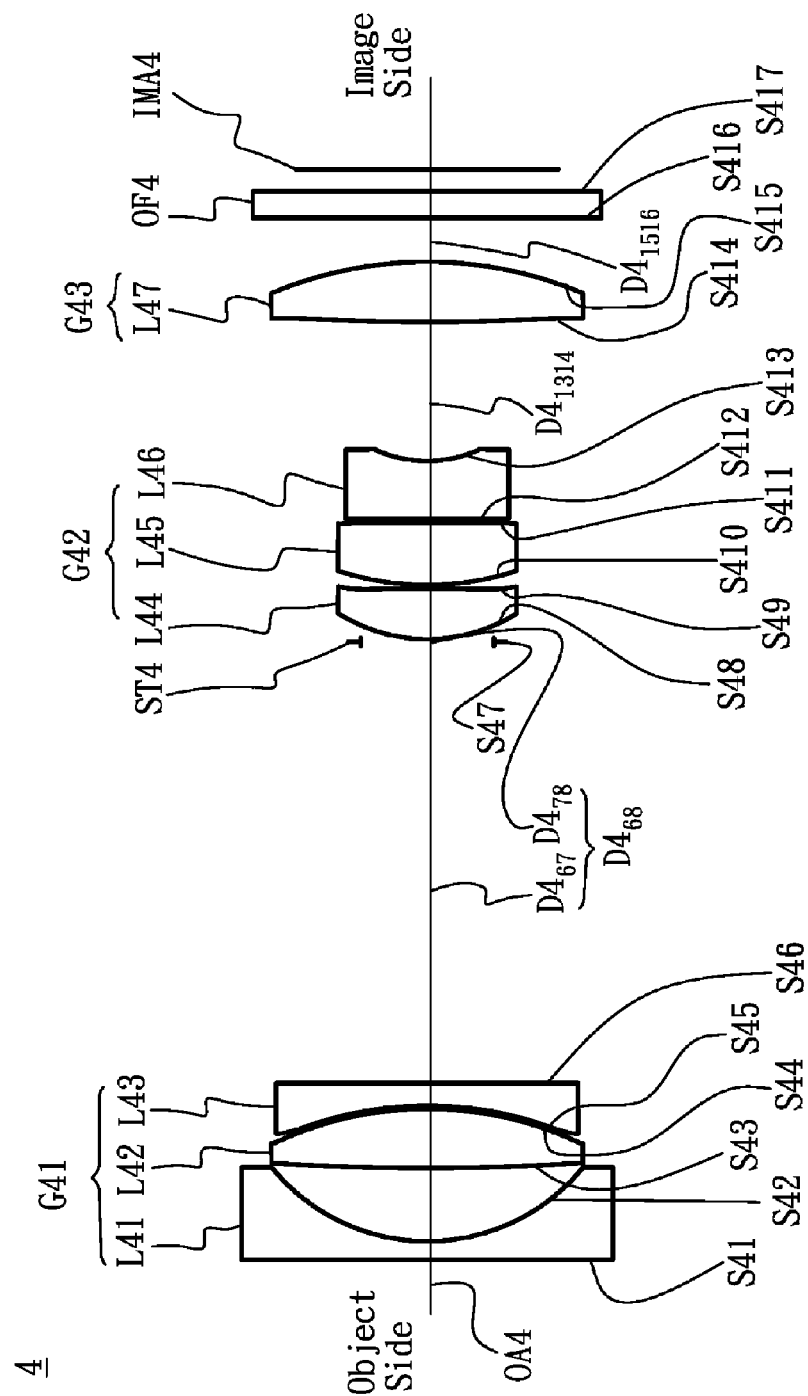
FIG. 7 is a lens layout diagram of a zoom lens at wide-angle end in accordance with a fourth embodiment of the invention.

Referring to FIG. 7, FIG. 7 is a lens layout diagram of a zoom lens at wide-angle end in accordance with a fourth embodiment of the invention. The zoom lens 4 includes a first lens group G41, a stop ST4, a second lens group G42, a third lens group G43 and an optical filter OF4, all of which are arranged in sequence from an object side to an image side along an optical axis OA4. The first, second and third lens groups G41, G42 and G43 are moved when the zoom lens 4 zooms from a wide-angle end to a telephoto end. Specifically, the second lens group G42 is moved toward the object side, the first lens group G41 is moved toward the image side and then toward the object side so that an interval $D4_{68}$ between the first lens group G41 and the second lens group G42 decreases, and the third lens group G43 is moved so that an interval $D4_{1314}$ between the second lens group G42 and the third lens group G43 varies. Therefore, an effective focal length of the zoom lens 4 is adjustable by means of changing intervals $D4_{68}$, $D4_{1314}$ of the lens groups when the zoom lens 4 is in use.

In the present embodiment, the first lens group G41 is with negative refractive power, the second lens group G42 is with positive refractive power and the third lens group G43 is with positive refractive power.

The first lens group G41 includes a first lens L41, a second lens L42 and a third lens L43, all of which are arranged in sequence from the object side to the image side along the optical axis OA4. The first lens L41 is a convex-concave lens and with negative refractive power. The object side surface S41 of the first lens L41 is a convex surface. The image side surface S42 of the first lens L41 is an aspheric surface. The second lens L42 is a biconvex lens and with positive refractive power. The third lens L43 is a concave-convex lens and with negative refractive power. The object side surface S45 of the third lens L43 is a concave surface and the concave surface is an aspheric surface.

The second lens group G42 includes a fourth lens L44, a fifth lens L45 and a sixth lens L46, all of which are arranged in sequence from the object side to the image side along the optical axis OA4. The fourth lens L44 is a biconvex lens and with positive refractive power. The object side surface S48 and the image side surface S49 of the fourth lens L44 are aspheric surfaces. The fifth lens L45 is a biconvex lens and with positive refractive power. The fourth lens L44 and the fifth lens L45 are separated by an air gap. The sixth lens L46 is a convex-concave lens and with negative refractive power. The image side surface S413 of the sixth lens L46 is a concave surface and the concave surface is an aspheric surface.

The third lens group G43 includes a seventh lens L47. The seventh lens L47 is a biconvex lens and with positive refractive power. The object side surface S414 and the image side surface S415 of the seventh lens L47 are aspheric surfaces. The seventh lens L47 is moved toward the object side when the zoom lens 4 focuses in short distance photography.

An interval $D4_{78}$ between the stop ST4 and the second lens group G42 is stationary. The optical filter OF4 is a glass plate and includes an object side surface S416 and an image side surface S417. Both of the object side surface S416 and the image side surface S417 are plane surfaces.

In order to maintain good optical performance of the zoom lens 4 in accordance with the present embodiment, the zoom lens 4 must satisfies the following four conditions:

$$|R4_{31}/R4_{32}| \leq 0.39 \tag{13}$$

$$0.30 \leq (f4_{G1} \times f4_{G2})/(f4_3 \times f4_4) \leq 0.75 \tag{14}$$

$$1.24 \leq |f4_{G1}/f4_{G2}| \leq 1.27 \tag{15}$$

$$1.66 \leq (f4_w \times L4_T)/(f4_T \times Y4) \leq 3.08 \tag{16}$$

wherein $R4_{31}$ is the radius of curvature of the object side surface S45 of the third lens L43, $R4_{32}$ is the radius of curvature of the image side surface S46 of the third lens L43, $f4_{G1}$ is the effective focal length of the first lens group G41, $f4_{G2}$ is the effective focal length of the second lens group G42, $f4_3$ is the effective focal length of the third lens L43, $f4_4$ is the effective focal length of the fourth lens L44, $f4_w$ is the effective focal length of the zoom lens 4 at wide-angle end, $f4_T$ is the effective focal length of the zoom lens 4 at telephoto end, Y4 is the largest image height at image plane IMA4 and $L4_T$ is the lens length of the zoom lens 4 at telephoto end.

Due to the above design of the lenses and stop ST4, the zoom lens 4 is miniaturized and provided with a good optical performance.

In order to achieve the above purpose and effectively enhance the optical performance, the zoom lens 4 at the wide-angle end, medium end (not shown) and telephoto end (not shown) of the present embodiment of the invention is provided with the optical specifications shown in Table 7, which include the effective focal length, radius of curvature of each lens surface, thickness between adjacent surface, refractive index of each lens and Abbe number of each lens. Table 7 shows that the effective focal length of the zoom lens 4 at the wide-angle end is equal to 4.43 mm, the effective focal length of the zoom lens 4 at the medium end is equal to 9.73 mm, the effective focal length of the zoom lens 4 at the telephoto end is equal to 21.04 mm, and the zoom ratio of the zoom lens 4 is about 4.75.

TABLE 7

| W (Wide-angle End) | Effective Focal Length = 4.43 mm |
| M (Medium End) | Effective Focal Length = 9.73 mm |
| T (Telephoto End) | Effective Focal Length = 21.04 mm |

| Surface Number | Radius of Curvature (mm) | Thickness (mm) | Nd | Vd | Remark |
| --- | --- | --- | --- | --- | --- |
| S41 | 260.000 | 0.600 | 1.87 | 41.0 | The First Lens Group G41 The First Lens L41 |
| S42 | 6.731 | 1.900 | | | |
| S43 | 52.917 | 1.650 | 1.74 | 28.3 | The First Lens Group G41 The Second Lens L42 |
| S44 | −9.495 | 0.100 | | | |
| S45 | −7.715 | 0.600 | 1.60 | 62.0 | The First Lens Group G41 The Third Lens L43 |

TABLE 7-continued

| W (Wide-angle End) | | | Effective Focal Length = 4.43 mm | | |
| M (Medium End) | | | Effective Focal Length = 9.73 mm | | |
| T (Telephoto End) | | | Effective Focal Length = 21.04 mm | | |

| Surface Number | Radius of Curvature (mm) | Thickness (mm) | Nd | Vd | Remark |
|---|---|---|---|---|---|
| S46 | −416.650 | 11.9509 (W) 3.4759 (M) 0.7000 (T) | | | Interval $D4_{67}$ |
| S47 | ∞ | 0.100 | | | Stop ST4 |
| S48 | 4.896 | 1.346 | 1.60 | 68.0 | The Second Lens Group G42 The Fourth Lens L44 |
| S49 | −62.185 | 0.100 | | | |
| S410 | 7.956 | 1.690 | 1.89 | 41.0 | The Second Lens Group G42 The Fifth Lens L45 |
| S411 | −91.733 | 0.100 | | | |
| S412 | 678.344 | 1.579 | 1.83 | 24.0 | The Second Lens Group G42 The Sixth Lens L46 |
| S413 | 3.579 | 3.7601 (W) 6.3573 (M) 18.5324 (T) | | | Interval $D4_{1314}$ |
| S414 | 60.000 | 1.600 | 1.60 | 68.0 | The Third Lens Group G43 The seventh Lens L47 |
| S415 | −15.854 | 1.2137 (W) 3.5726 (M) 2.1267 (T) | | | Interval $D4_{1516}$ |
| S416 | ∞ | 0.720 | 1.51633 | 64.142 | Optical Filter OF4 |
| S417 | ∞ | 0.590 | | | |

The aspheric surface sag z of each lens in table 7 can be calculated by the following formula:

$$z = ch^2/\{1+[1-(k+1)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F and G are aspheric coefficients.

In the present embodiment, the conic constant k and the aspheric coefficients A, B, C, D, E, F, G of each surface are shown in Table 8.

TABLE 8

| | Surface Number | | | | | | |
|---|---|---|---|---|---|---|---|
| | S42 | S45 | S48 | S49 | S413 | S414 | S415 |
| K | 0.148707249 | 0.000656538 | 0.002680175 | 0 | 0 | 0 | 0 |
| A | 0.000532394 | 0.001091214 | −0.000569554 | 0.000756394 | 0.002777755 | 0.000250829 | −0.000630892 |
| B | 2.68517E−05 | −9.82418E−05 | 0.000289697 | 2.23497E−05 | 0.000462935 | −2.00042E−05 | −1.30592E−05 |
| C | −1.1304E−07 | 2.8988E−05 | −8.76799E−05 | 0.000133687 | −0.000195141 | −6.04321E−07 | −2.03079E−07 |
| D | 1.69928E−08 | −4.30558E−06 | 2.74724E−05 | −5.77752E−05 | 5.3647E−05 | 2.50371E−08 | 5.19281E−09 |
| E | 3.88981E−09 | 3.51605E−07 | −3.74389E−06 | 1.31005E−05 | 4.73992E−06 | 0 | 5.79898E−10 |
| F | 0 | −1.4377E−08 | 2.95377E−07 | −8.91004E−07 | −3.88954E−06 | 0 | 0 |
| G | 0 | 2.40421E−10 | −6.58311E−10 | 0 | 0 | 0 | 0 |

For the zoom lens 4 of the present embodiment, the radius of curvature $R4_{31}$ of the object side surface S45 of the third lens L43 is equal to −7.7145 mm, the radius of curvature $R4_{32}$ of the image side surface S46 of the third lens L43 is equal to −416.6499 mm, the effective focal length $f4_{G1}$ of the first lens group G41 is equal to −9.4095 mm, the effective focal length $f4_{G2}$ of the second lens group G42 is equal to 7.50667 mm, the effective focal length $f4_3$ of the third lens L43 is equal to −13.10729 mm, the effective focal length $f4_4$ of the fourth lens L44 is equal to 7.62128 mm, the effective focal length $f4_w$ of the zoom lens 4 at wide-angle end is equal to 4.4281 mm, the effective focal length $f4_T$ of the zoom lens 4 at telephoto end is equal to 21.0349 mm, the largest image height Y4 at image plane IMA4 is equal to 4.07 mm, and the lens length $L4_T$ of the zoom lens 4 at telephoto end is equal to 34.0339 mm. According to the above data, the following values can be obtained:

$|R4_{31}/R4_{32}|=0.019$, $(f4_{G1} \times f4_{G2})/(f4_3 \times f4_4) \le 0.707$, $|f4_{G1}/f4_{G2}| \le 1.253$, $(f4_w \times L4_T)/(f4_T \times Y4) \le 1.760$, which respectively satisfy the above conditions (13)-(16).

By the above arrangements of the lenses and stop ST4, the zoom lens 4 of the present embodiment at the wide-angle end, medium end (not shown) and telephoto end (not shown) can meet the requirements of optical performance, wherein the longitudinal aberration, the field curvature, the distortion, the transverse ray aberration and the lateral color (the above figures are similar to the figures of the first embodiment, therefore are omitted) can be corrected effectively, thereby capable of obtaining good optical performance.

While the invention has been described by way of examples and in terms of embodiments, it is to be understood that the invention is not limited thereto. To the contrary, it is intended to cover various modifications and similar arrangements (as would be apparent to those skilled in the art).

Therefore, the scope of the appended claims should be accorded the broadest interpretation so as to encompass all such modifications and similar arrangements.

What is claimed is:

1. A zoom lens comprising a first lens group, a second lens group and a third lens group, all of which are arranged in sequence from an object side to an image side along an optical axis, wherein:
the first lens group is with negative refractive power and comprises a first lens, a second lens and a third lens, all of which are arranged in sequence from the object side to the image side along the optical axis, wherein the first lens is with negative refractive power, the second lens is with positive refractive power and the third lens is with negative refractive power;
the second lens group is with positive refractive power;
the third lens group is with positive refractive power; and
the third lens satisfies $|R_{31}/R_{32}| \leq 0.39$, wherein $R_{31}$ is a radius of curvature of an object side surface of the third lens and $R_{32}$ is a radius of curvature of an image side surface of the third lens.

2. The zoom lens as claimed in claim 1, wherein the second lens group is moved toward the object side, the first lens group is moved toward the image side and then toward the object side so that an interval between the first lens group and the second lens group decreases, and the third lens group is moved, when the zoom lens zooms from a wide-angle end to a telephoto end.

3. The zoom lens as claimed in claim 1, wherein the first lens group, the second lens group, the third lens group and the fourth lens satisfy:

$$0.30 \leq (f_{G1} \times f_{G2})/(f_3 \times f_4) \leq 0.75$$

wherein $f_{G1}$ is an effective focal length of the first lens group, $f_{G2}$ is an effective focal length of the second lens group, $f_3$ is an effective focal length of the third lens and $f_4$ is an effective focal length of the fourth lens.

4. The zoom lens as claimed in claim 1, wherein the first lens group and the second lens group satisfy:

$$1.24 \leq |f_{G1}/f_{G2}| \leq 1.27$$

wherein $f_{G1}$ is an effective focal length of the first lens group and $f_{G2}$ is an effective focal length of the second lens group.

5. The zoom lens as claimed in claim 1, wherein the zoom lens satisfies:

$$1.66 \leq (f_w \times L_T)/(f_T \times Y) \leq 3.08$$

wherein $f_w$ is an effective focal length of the zoom lens at a wide-angle end, $f_T$ is an effective focal length of the zoom lens at a telephoto end, Y is a largest image height at the image plane and $L_T$ is a lens length of the zoom lens at the telephoto end.

6. The zoom lens as claimed in claim 1, wherein the first lens is a convex-concave lens and comprises a convex surface facing the object side, the second lens is a biconvex lens and the third lens is a concave-convex lens and comprises a concave surface facing the object side.

7. The zoom lens as claimed in claim 6, wherein the third lens comprises two surfaces, at least one of which is an aspheric surface or both of which are aspheric surfaces.

8. The zoom lens as claimed in claim 6, wherein the first lens comprises two surfaces, at least one of which is an aspheric surface or both of which are aspheric surfaces.

9. The zoom lens as claimed in claim 1, wherein the second lens group comprises a fourth lens, a fifth lens and a sixth lens, all of which are arranged in sequence from the object side to the image side along the optical axis.

10. The zoom lens as claimed in claim 9, wherein the fourth lens is with positive refractive power, the fifth lens is with positive refractive power and the sixth lens is with negative refractive power.

11. The zoom lens as claimed in claim 10, wherein the fourth lens is a biconvex lens and the fifth lens is a biconvex lens.

12. The zoom lens as claimed in claim 11, wherein the sixth lens comprises two surfaces, at least one of which is an aspheric surface or both of which are aspheric surfaces.

13. The zoom lens as claimed in claim 1, wherein at least a surface of the first lens group is an aspheric surface and at least two surfaces of the second lens group are aspheric surfaces.

14. The zoom lens as claimed in claim 1, wherein the third lens group comprises a seventh lens, the seventh lens is a biconvex lens and comprises two surfaces, at least one of which is an aspheric surface or both of which are aspheric surfaces, and the seventh lens is moved toward the object side when the zoom lens focuses in short distance photography.

15. The zoom lens as claimed in claim 1, further comprising a stop disposed between the first lens group and the second lens group, wherein an interval between the stop and the second lens group is stationary.

16. A zoom lens comprising a first lens group, a second lens group and a third lens group, all of which are arranged in sequence from an object side to an image side along an optical axis, wherein:
the first lens group is with negative refractive power and comprises a first lens, a second lens and a third lens, all of which are arranged in sequence from the object side to the image side along the optical axis, wherein the first lens is with negative refractive power, the second lens is with positive refractive power and the third lens is with negative refractive power;
the second lens group is with positive refractive power and comprises a fourth from the object side to the image side along the optical axis, wherein the sixth lens is with negative refractive power; and
the third lens group is with positive refractive power.

17. The zoom lens as claimed in claim 16, wherein the third lens satisfies $|R_{31}/R_{32}| \leq 0.39$, wherein $R_{31}$ is a radius of curvature of an object side surface of the third lens and $R_{32}$ is a radius of curvature of an image side surface of the third lens.

18. The zoom lens as claimed in claim 16, wherein the zoom lens satisfies:

$$1.66 \leq (f_w \times L_T)/(f_T \times Y) \leq 3.08$$

wherein $f_w$ is an effective focal length of the zoom lens at a wide-angle end, $f_T$ is an effective focal length of the zoom lens at a telephoto end, Y is a largest image height at the image plane and $L_T$ is a lens length of the zoom lens at the telephoto end.

19. The zoom lens as claimed in claim 16, wherein the first lens group and the second lens group satisfy:

$$1.24 \leq |f_{G1}/f_{G2}| \leq 1.27$$

wherein $f_{G1}$ is an effective focal length of the first lens group and $f_{G2}$ is an effective focal length of the second lens group.

20. The zoom lens as claimed in claim 16, wherein the fourth lens is with positive refractive power and the fifth lens is with positive refractive power.

21. The zoom lens as claimed in claim 20, wherein the fourth lens is a biconvex lens and the fifth lens is a biconvex lens.

22. The zoom lens as claimed in claim 20, wherein the fourth lens and the fifth lens are separated by an air gap.

* * * * *